US008873101B2

(12) United States Patent
Tamura

(10) Patent No.: US 8,873,101 B2
(45) Date of Patent: Oct. 28, 2014

(54) IMAGE PROCESSING APPARATUS AND IMAGE PROCESSING METHOD

(75) Inventor: Hirokazu Tamura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 3 days.

(21) Appl. No.: 13/304,921

(22) Filed: Nov. 28, 2011

(65) Prior Publication Data

US 2012/0140248 A1 Jun. 7, 2012

(30) Foreign Application Priority Data

Dec. 6, 2010 (JP) ................................ 2010-271690

(51) Int. Cl.

| | |
|---|---|
| ***G06K 15/02*** | (2006.01) |
| ***G03G 15/01*** | (2006.01) |
| ***G03G 15/043*** | (2006.01) |
| *G06K 15/00* | (2006.01) |
| *G06K 15/22* | (2006.01) |

(52) U.S. Cl.

CPC .......... *G03G 15/0115* (2013.01); *G03G 15/043* (2013.01)

USPC ........... 358/1.2; 358/1.16; 358/1.18; 358/1.3; 358/1.4

(58) Field of Classification Search

CPC ........... G06F 15/00; H04N 1/405; H04N 1/60

See application file for complete search history.

(56) References Cited

U.S. PATENT DOCUMENTS

| | | | | |
|---|---|---|---|---|
| 7,630,100 | B2 * | 12/2009 | Tojima et al. | 358/3.26 |
| 2003/0174364 | A1 | 9/2003 | Goto | |
| 2006/0119895 | A1 * | 6/2006 | Takata et al. | 358/3.26 |
| 2009/0034029 | A1 * | 2/2009 | Nakamura | 358/505 |

FOREIGN PATENT DOCUMENTS

| | | | |
|---|---|---|---|
| CN | 1845014 | A | 10/2006 |
| CN | 101359204 | A | 2/2009 |
| EP | 1710999 | A1 | 10/2006 |
| JP | 2003-274143 | A | 9/2003 |
| JP | 2004-170755 | A | 6/2004 |
| JP | 2005-349655 | A | 12/2005 |

* cited by examiner

*Primary Examiner* — Fred Guillermety
*Assistant Examiner* — Henok A Shiferaw
(74) *Attorney, Agent, or Firm* — Canon USA, Inc. IP Division

(57) ABSTRACT

A correction in less than one pixel raises an issue of generation of image defect such as density unevenness caused by a destruction of a screen pattern that generates a cycle of image data. To solve this issue, an image processing apparatus includes a correction unit configured to perform a correction less than one pixel on image data, and a changing processing unit configured to perform a correction by one pixel on image data, wherein the correction unit performs processing for correction in less than one pixel by shifting a pixel according to a moving locus synchronized with a cycle of the image data.

7 Claims, 21 Drawing Sheets

| CHANGING POINT | P1 | P2 | P3 | P4 | P5 | P6 | P7 | P8 | ............ | Pm-2 | Pm-1 | Pm |
|---|---|---|---|---|---|---|---|---|---|---|---|---|
| DIRECTION | ↑ | ↑ | ↑ | ↓ | ↓ | ↓ | ↓ | ↑ | ............ | ↓ | ↓ | – |

m BIT

STORED DATA: 1 1 1 0 0 0 0 1 ..................... 0 0 0

0: DOWNWARD CHANGE
1: UPWARD CHANGE

TARGET LINE
Pa
Pb 0
1
2
3

FIG.20A
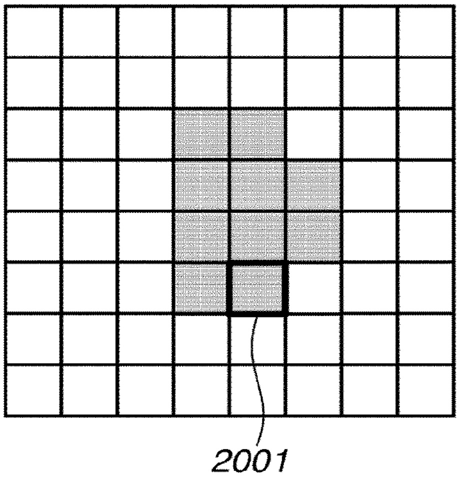
FIG.20B
| | | | | | | | |
|---|---|---|---|---|---|---|---|
| 0 | 0 | 1 | 2 | 0 | 0 | 0 | 0 |
| 0 | 0 | 1 | 2 | 0 | 0 | 0 | 0 |
| 0 | 0 | 1 | 2 | 0 | 0 | 0 | 0 |
| 0 | 0 | 0 | 1 | 2 | 0 | 0 | 0 |
| 0 | 0 | 0 | 1 | 2 | 0 | 0 | 0 |
| 0 | 0 | 0 | 1 | 2 | 0 | 0 | 0 |
| 0 | 0 | 0 | 0 | 1 | 2 | 0 | 0 |
| 0 | 0 | 0 | 0 | 1 | 2 | 0 | 0 |
FIG.20C
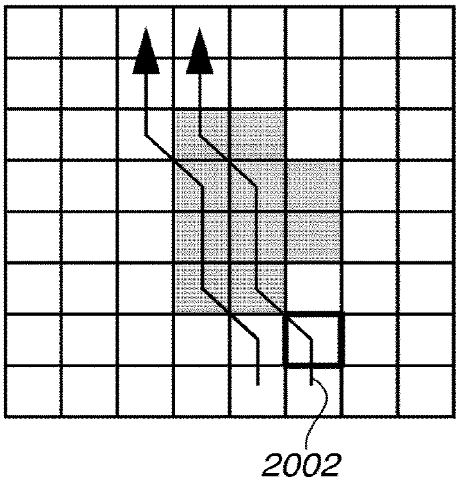
FIG.20D
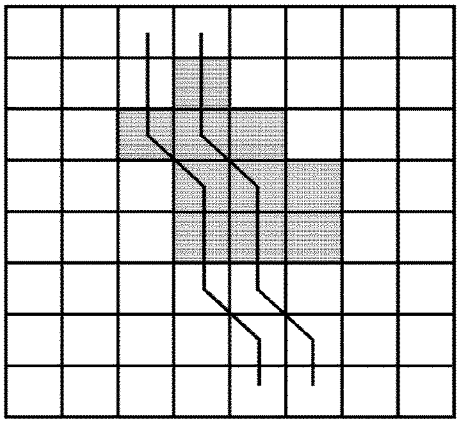

IMAGE PROCESSING APPARATUS AND IMAGE PROCESSING METHOD

BACKGROUND OF THE INVENTION

1. Field of the Invention

The present invention relates to an image processing apparatus and an image processing method.

2. Description of the Related Art

An electrophotographic method is known as an image recording method used in a color image forming apparatus such as a color printer and a color copying machine. In the electrophotographic method, a latent image is formed on a photosensitive drum using a laser beam to develop the latent image by a charged color material (hereinafter referred to as "toner"). An image recording is performed such that the developed toner image is transferred to a transfer sheet to fix the image thereon.

Recently, for increasing a speed in forming an image in a color image forming apparatus using the electrophotographic method, tandem type color image forming apparatuses have increased that include the number of developing machines and the number of photosensitive drums (i.e., image recording units) corresponding to the number of toner colors and that sequentially transfers images of different colors on an image conveyance belt or a recording medium. In the tandem type color image forming apparatus, a plurality of factors for causing misregistration is known, and thus various methods are discussed for solving each of the factors.

Examples of the factors include unevenness and a mounting position deviation of a lens in a deflection scanning device and an assembling position deviation of the deflection scanning device to a color image forming apparatus body. Due to the positional deviation, an inclination or a bending of a scanning line occurs, and a degree of the bending (hereinafter referred to as "profile") differs in each color for a color component of a toner, which causes the misregistration. Characteristics of the profile differs between image forming apparatus, i.e., between recording engines or between image recording units of different colors.

To solve an issue of the misregistration, for example, Japanese Patent Application Laid-Open No. 2004-170755 discusses a method in which degrees of an inclination and a bending of a scanning line are measured by an optical sensor and bitmap image data is corrected so as to offset the inclination and bending, thereby forming an image of the corrected image data. In this method, a mechanically adjustable member and an adjustment step upon assembling the apparatus are no longer required since the image data is processed to be electrically corrected. Therefore, downsizing of the color image forming apparatus can be achieved and the issue of the misregistration can be solved inexpensively.

The electrical misregistration correction includes a correction in one pixel unit and a correction in less than one pixel. In the correction in one pixel unit, pixels are offset by the one pixel in a sub-scanning direction according to correction amounts of the inclination and the bending. In a case where the above described method is used, the bending or the inclination caused due to the above described misregistration is about a range between 100 and 500 μm. In the image forming apparatus having a resolution of 600 dpi, an image memory for storing several tens of lines is required for the above described correction. In the below description, a position on the scanning line at which the pixel is offset is referred to as a changing point.

The correction in less than one pixel is performed such that a gradation value of the image data is adjusted by pixels before and the after a target pixel in the sub-scanning direction. The correction in less than one pixel can eliminate an unnatural step at a boundary of a changing point generated as a result of the correction in one pixel unit to smooth the image.

In a case where the above described smoothing processing is performed on an image that has been subjected to screen processing and is immediately before the printing, the smoothing processing is performed such that a pulse width modulation (PWM) is performed on a laser beam and a laser exposure time is gradually switched in the sub-scanning direction for smoothing the image. For example, in a case of a correction of 0.5 pixel, i.e., a correction in less than one pixel, the smoothing processing is realized by interpolation processing in which a half exposure is performed twice upwardly and downwardly in the sub-scanning direction.

Such interpolation processing can be performed only when a linear relationship is established between an exposure time of the PWM and an image density. Actually, a density obtained by the one time exposure of one pixel cannot be obtained in the two times exposure of 0.5 pixel in many cases. Therefore, if the density reproduced by the PWM cannot maintain the linearity to a density signal of a target to be processed, there exist two types of image data, i.e., image data that is preferably subjected to the above described interpolation processing and image data of which image quality may be degraded when it is corrected.

For example, with respect to patterns drawn by repeating the same designs or patterns (hereinafter referred to as "patterned image"), characters, and drawings which can be drawn by, for example, office word-processing software, the interpolation processing provided thereto, i.e., the smoothing processing thereof, can improve visibility of information. To the contrary, if the interpolation processing is performed at a changing point of a continuous tone image subjected to screen processing, an issue arises that density unevenness occurs only on the changing point due to correction processing, resulting in image quality deterioration. This is because, in a case where, for example, a line growth screen is used, the density appears to change in a macro perspective view since a line thickness in the screen changes on the changing point according to the interpolation processing. Further, in a case where an add-on image such as a copy-forgery-inhibited pattern is subjected to the interpolation processing, an effect of the interpolation processing might be lost. Therefore, the interpolation processing is not suitable to be performed for the add-on image.

Thus, if the interpolation processing using the PWM is performed, whether the interpolation processing is applied is determined according to an attribute of target image data. To resolve the above issue, such a method can be proposed that a continuous tone image determination unit and a patterned image determination unit are used to finally obtain an interpolation determination result from the determination results of these two units. In the continuous tone image determination unit, an image that is not to be interpolated can be determined. In the patterned image determination unit, an image that is to be interpolated can be determined.

For example, Japanese Patent Application Laid-Open No. 2003-274143 discusses a misregistration correction according to a geometric transformation with respect to an image after the screen processing. By inserting or deleting a pixel at a cycle at which no interference occurs with respect to a halftone dot cycle of a screen, the geometric transformation of the image is performed without causing unevenness and a moire of gradations. Such a minute transformation is realized by inserting or removing a pixel itself of a high resolution image without performing a pulse width modulation such as the PWM to partially shift the image in the main scanning direction or the sub-scanning direction.

As described above, it is difficult to perform the interpolation processing on any image while maintaining a good image quality of the image reproduced by a pulse width of the PWM in a state in which the linearity to a target density signal is hard to be established. Therefore, determination processing is required in providing the interpolation processing. However, in a case where an arbitrary image, e.g., a print image, is input from a user or an application, an erroneous determination may be made because of the determination processing.

In order to provide a high speed real time determination so as to catch up with a printing speed with respect to an arbitrary image, image determination processing needs to be performed by means of hardware since a real time determination cannot be performed at a satisfied speed by means of software. However, in attempting to perform the image determination processing by means of hardware, a circuit may require a complicated configuration depending on processing to be performed, which causes an increase of a size of the circuit. To the contrary, in attempting to perform the image determination processing by means of practical hardware, complicated determination processing cannot be performed in many cases.

In a case of performing the determination based on attribute information to be output from the user or the application about characters and photographs generated upon image rendering, similar to the above, there is a risk of the erroneous determination. In view of the image quality, in a case where the interpolation processing is not provided to the continuous tone image subjected to the screen processing, as described above, a step of one pixel that occurs at the changing point will be accepted. Accordingly, the step may be visually recognized as deterioration of the image depending on a type of the image.

An absolute amount of the corrected step needs to be minimized to the extent that is less than a certain value that a person hardly visually notices it. Since the absolute amount of the step of one pixel differs according to resolutions of printers, the step of one pixel needs to be divided into several steps according to the resolutions to generate steps less than one pixel. In a case where the geometric transformation is performed by shifting the image using the above described insertion or removal of the pixel, the size of the pixel needs to be as small as possible to the extent that a person hardly visually notices. Thus, high resolution is required. If image data after a pixel is inserted thereinto or removed therefrom is only shifted vertically with respect to the sub-scanning direction or the main scanning direction, a screen pattern is partially destroyed even if the pixel is inserted or removed by a cycle that avoids the interference.

Conventionally, there has been an issue that an image defect such as density unevenness occurs because the screen pattern that generates the cycle of screen of the image data is destroyed by the correction of the step less than one pixel.

SUMMARY OF THE INVENTION

According to an aspect of the present invention, an image processing apparatus includes a correction unit configured to perform a correction less than one pixel on image data, and a changing processing unit configured to perform a correction by one pixel on image data, wherein the correction unit performs processing for correction in less than one pixel by shifting a pixel according to a moving locus synchronized with a cycle of the image data.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 20A through 20D illustrate a state of a moving locus of a dot along a screen cycle.

DESCRIPTION OF THE EMBODIMENTS

Various exemplary embodiments, features, and aspects of the invention will be described in detail below with reference to the drawings.

Figure 1:
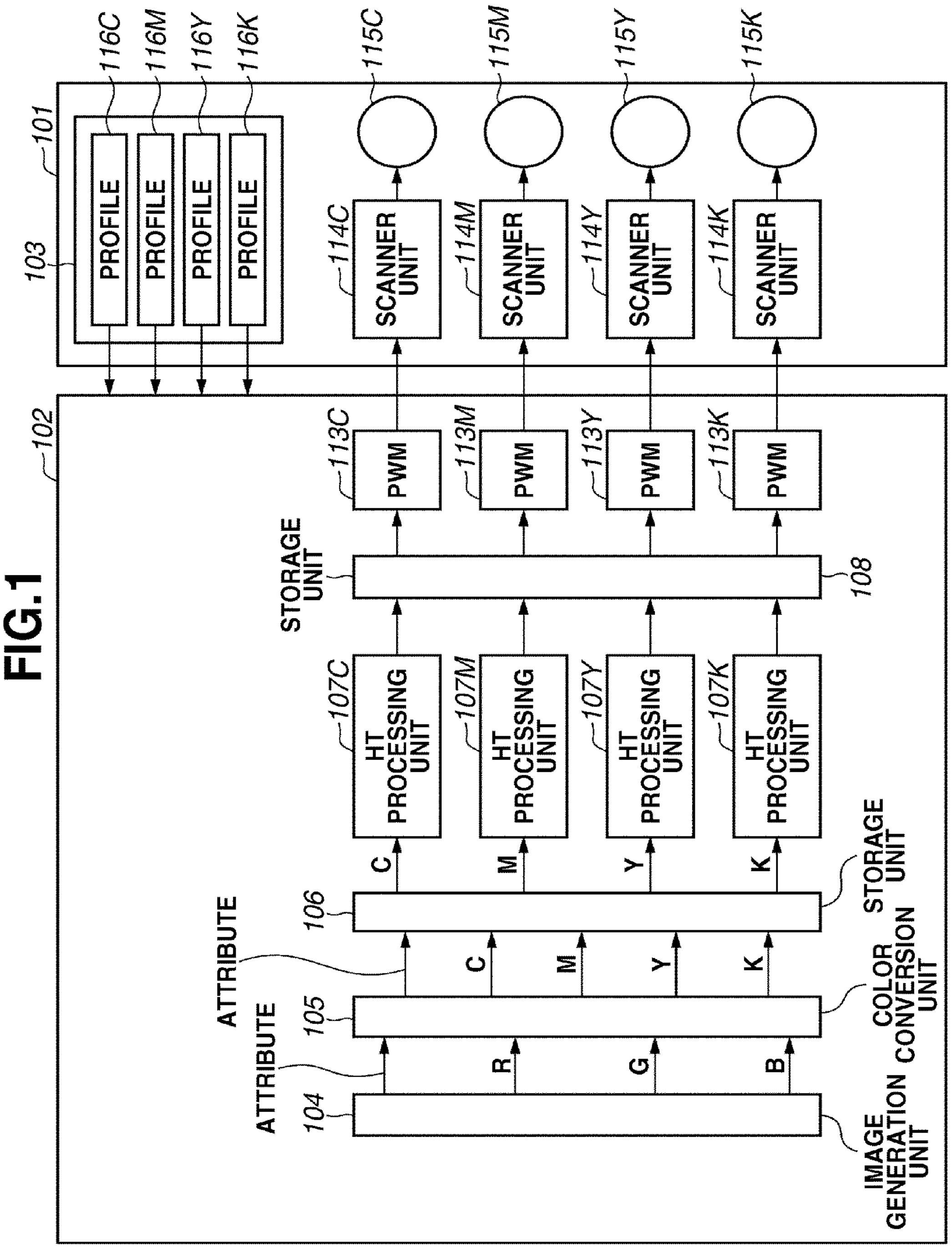
FIG. 1 is a block diagram illustrating the configuration of an image forming apparatus.

FIG. 1 illustrates a configuration of each block relating to creation of an electrostatic latent image by a color image forming apparatus employing an electrophotographic method according to a first exemplary embodiment. The color image forming apparatus includes an image forming unit 101 and an image processing unit 102. The image processing unit 102 generates bitmap image information. The image forming unit 101 forms an image on a recording medium based on the bitmap image information.

Figure 2:
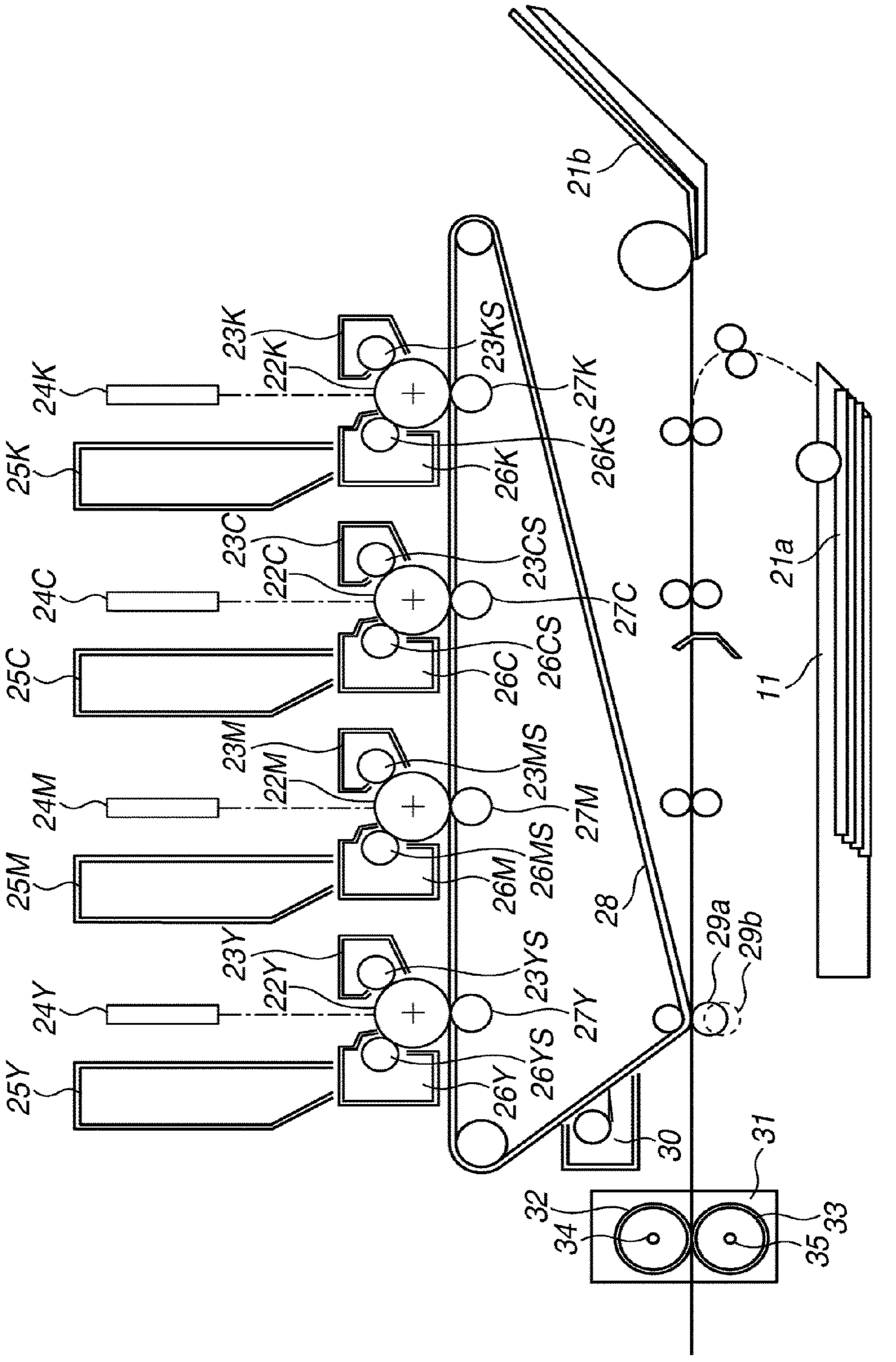
FIG. 2 is a cross sectional view of the image forming apparatus.

FIG. 2 is a cross sectional view of the color image forming apparatus using a tandem type electrophotographic method in which an intermediate transfer member 28 is employed. With reference to FIG. 1, an operation of the image forming unit 101 in the color image forming apparatus using the electrophotographic method is described below.

The image forming unit 101 drives exposure light according to an exposure time processed by the image processing unit 102 to form an electrostatic latent image. The image forming unit 101 develops the electrostatic latent image to form a single-color toner image. A plurality of single-color toner images are superimposed one another to form a multi-color toner image in the image forming unit 101. The image forming unit 101 transfers the multi-color toner image to a recording medium 11 in FIG. 2 to fix the multi-color toner image on the recording medium 11.

In FIG. 2, four injection chargers 23Y, 23M, 23C, and 23K are provided for charging photosensitive members 22Y, 22M, 22C, and 22K, respectively, according to the corresponding colors yellow (Y), magenta (M), cyan (C), and black (K). Each of the injection chargers includes a corresponding one of sleeves 23YS, 23MS, 23CS, and 23KS.

The photosensitive members 22Y, 22M, 22C, and 22K are rotated such that driving forces of driving motors (not illustrated) are transferred to the photosensitive members, respectively. The driving motors rotate the photosensitive members 22Y, 22M, 22C, and 22K, respectively, in a counterclockwise direction according to an image forming operation. Exposure units irradiate the photosensitive members 22Y, 22M, 22C, and 22K with the exposure light emitted from scanner units 24Y, 24M, 24C, and 24K, respectively. The exposure units selectively expose surfaces of the photosensitive members 22Y, 22M, 22C, and 22KA to the exposure light, so that the electrostatic latent images are formed thereon.

In FIG. 2, four development units 26Y, 26M, 26C, and 26K are provided for developing the electrostatic latent images for each of the colors Y, M, C, and K in order to visualize the electrostatic latent images. Each of the development units includes a corresponding one of sleeves 26YS, 26MS, 26CS, and 26KS. Each of the development units 26Y, 26M, 26C, and 26K is configured to be detachable.

An intermediate transfer member 28 of FIG. 2 is rotated in a clockwise direction in order to receive a single-color toner image from the photosensitive member 22. The single-color toner images are sequentially transferred to the intermediate transfer member 28 according to rotations of primary transfer rollers 27Y, 27M, 27C, and 27K positioned correspondingly facing to the photosensitive members 22Y, 22M, 22C, and 22K. A suitable bias voltage is applied to the primary transfer roller 27. A rotation speed of the photosensitive member 22 is differentiated from a rotation speed of the intermediate transfer member 28, so that the single-color toner images can be effectively transferred onto the intermediate transfer member 28. This processing is referred to as a primary transfer.

The single-color toner image at each station is superimposed onto the intermediate transfer member 28. The superimposed multi-color toner image is conveyed to a secondary transfer roller 29 along with a rotation of the intermediate transfer member 28. At the same time, the recording medium 11 is pinched and conveyed from a paper feed tray 21 to the secondary transfer roller 29, and the multi-color toner image on the intermediate transfer member 28 is transferred to the recording medium 11. At the time, a suitable bias voltage is applied to the secondary transfer roller 29, thereby enabling an electrostatic transfer of the toner image. This processing is referred to as a secondary transfer.

The secondary transfer roller 29 abuts on the recording medium 11 at a position 29*a* while the multi-color toner image is transferred to the recording medium 11. After the print processing, the secondary transfer roller 29 retracts to a position 29*b*.

A fixing apparatus 31 includes a fixing roller 32 and a pressure roller 33. The fixing roller 32 applies heat to the recording medium 11 and the pressure roller 33 presses the recording medium 11 onto the fixing roller 32 so that the multi-color toner image transferred to the recording medium 11 is molten and fixed to the recording medium 11. The fixing roller 32 and the pressure roller 33 are formed into a hollow shape and include therein heaters 34 and 35, respectively. The fixing apparatus 31 conveys the recording medium 11 carrying the multi-color toner image by the fixing roller 32 and the pressure roller 33 and applies heat and pressure to the recording medium 11 to fix the toner to the recording medium 11.

The recording medium 11 after the toner is fixed thereto is subsequently discharged to a discharge tray (not illustrated) by a discharging roller (not illustrated). Then, an image forming operation is ended. A cleaning unit 30 cleans toners remaining on the intermediate transfer member 28. The waste toners remaining on the intermediate transfer member 28 after the transfer of the multi-color toner image of four colors formed on the intermediate transfer member 28 to the recording medium 11 are stored in a cleaner container.

Figure 3A:
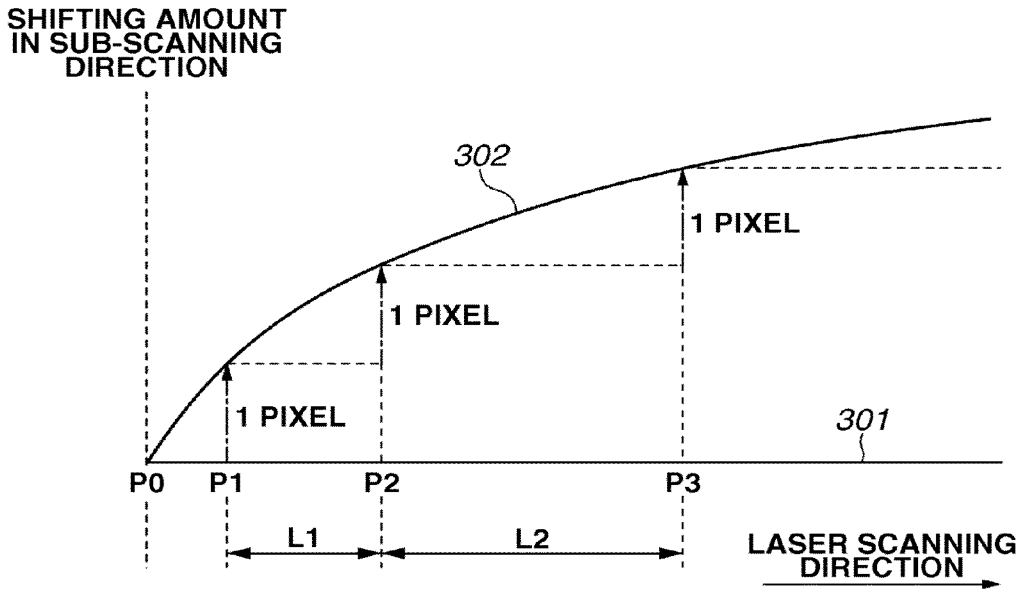
FIGS. 3A and 3B illustrate an example of profile characteristics of the image forming apparatus.
Figure 3B:
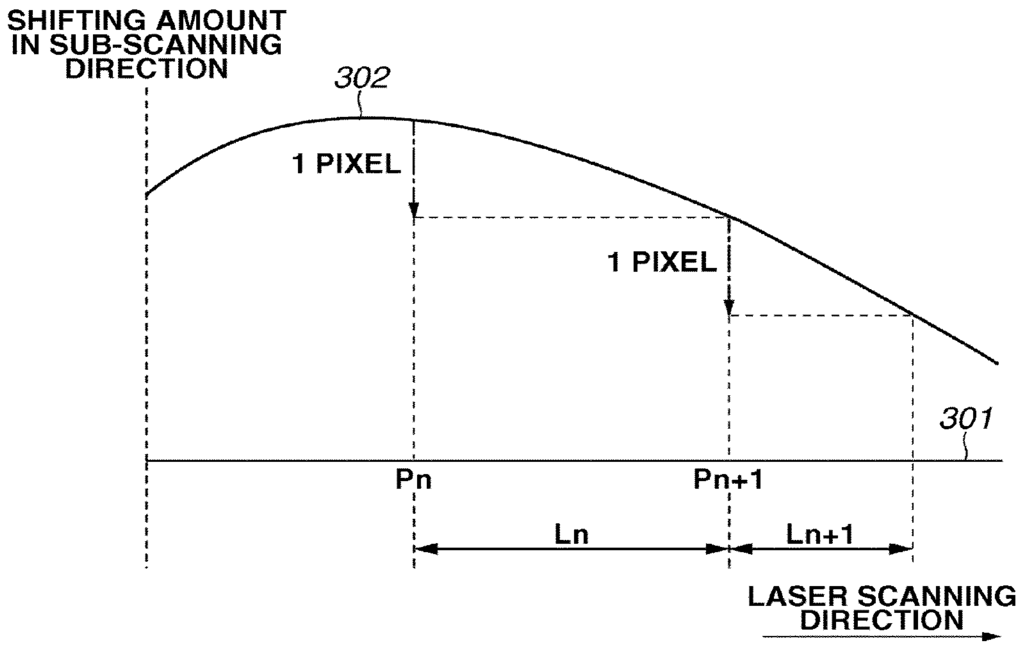

The profile characteristics of the scanning line for each color of the color image forming apparatus is described below with reference to FIGS. 3A through 3C, FIGS. 4A through 4D, and FIGS. 5A through 5C. FIG. 3A illustrates, as the profile characteristics of the image forming apparatus, an area that is shifted upwardly with respect to a laser scanning direction. FIG. 3B illustrates, as the profile characteristics of the image forming apparatus, an area shifting downwardly with respect to the laser scanning direction. An ideal scanning line 301 represents a characteristics in a case where scanning is performed vertical to a rotation direction of the photosensitive member 22.

The profile characteristics is described hereinafter as a direction in which the correction is to be made by the image processing unit 102. However, a definition as the profile characteristics is not limited thereto. In other words, a shifting direction with respect to the ideal scanning line of the image forming unit 101 is defined as the profile and the image processing unit 102 may perform an inverse correction.

Figure 4A:
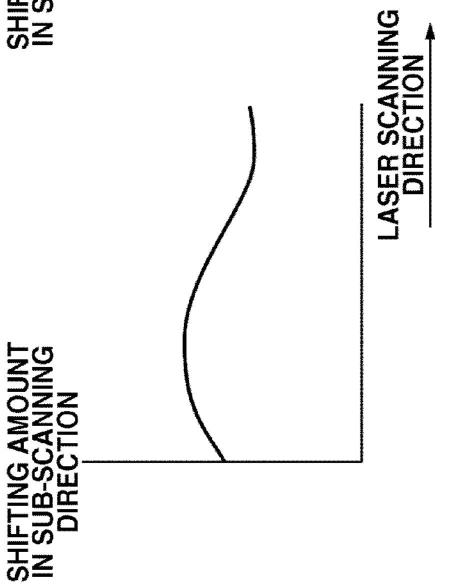
FIGS. 4A through 4D illustrate a relationship between a misregistration and a correction direction of the image forming apparatus.
Figure 4B:
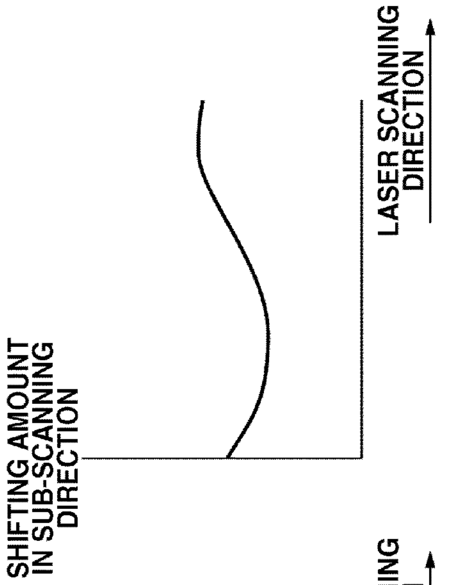
Figure 4C:
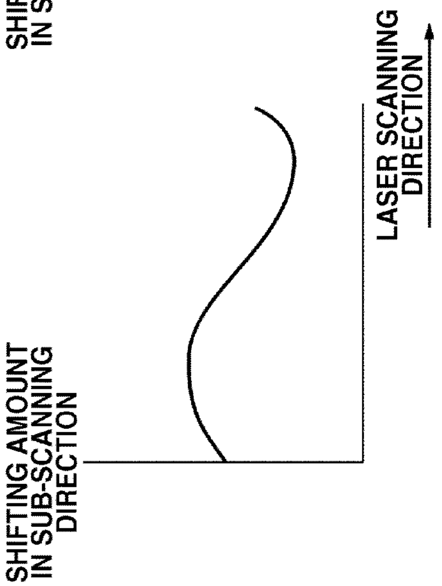
Figure 4D:
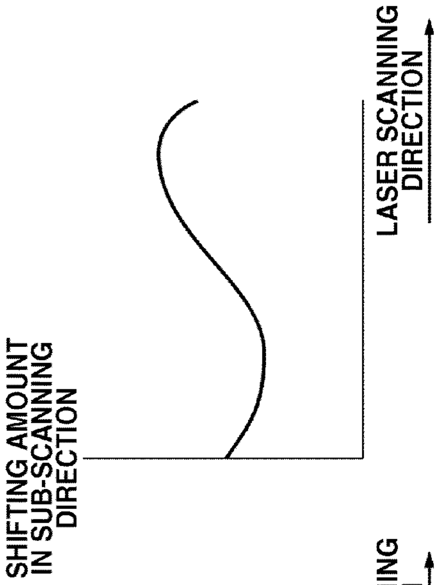

FIGS. 4A through 4D illustrate a correlation between a view illustrating a direction in which the correction is to be made by the image processing unit 102 and a view illustrating the shifting direction by the image forming unit 101 according to the definition of the profile. In a case where a bending characteristics is shown as illustrated in FIG. 4A as a direction in which correction is to be made by the image processing unit 102, the profile characteristics of the image forming unit 101 becomes a line that is inversely bending as illustrated in FIG. 4B. To the contrary, in a case where the bending characteristics of the image forming unit 101 is shown as illustrated in FIG. 4C, the profile characteristics of the image forming unit 101 becomes a line bending in a direction that the correction is to be made by the image processing unit 102 as illustrated in FIG. 4D.

Figures 5A, 5B, 5C:
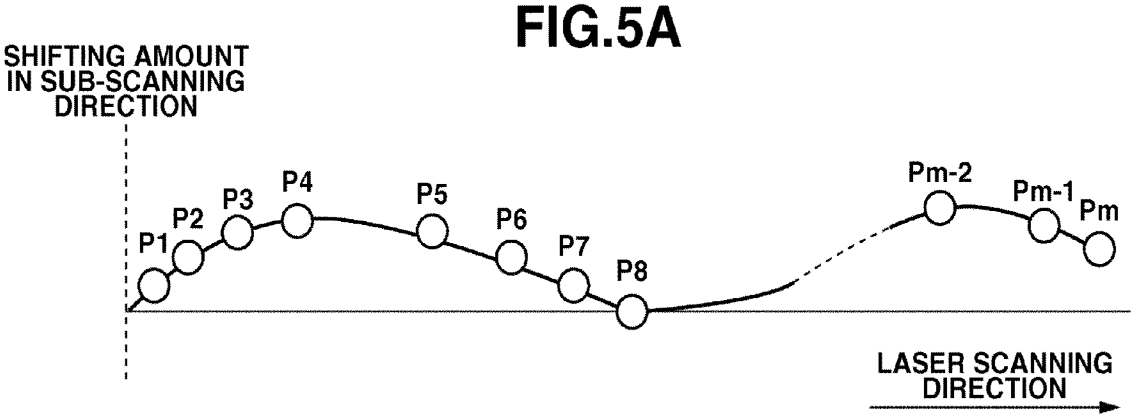
FIGS. 5A through 5C illustrate a data storage method of the profile characteristics.

How to store data of the profile characteristics is, for example as illustrated in FIGS. 5A through 5C, to maintain pixel positions at the changing points in the main scanning direction and directionality of change till the next changing point. More specifically, taking FIG. 5A for example, the changing points P1, P2, P3, . . . and Pm are defined with respect to the profile characteristics. Each changing point is defined as a point at which the scanning line is shifted by one pixel in the sub-scanning direction. Regarding a direction, there are a change in the upward direction and a change in the downward direction until the next changing point.

For example, a changing point P2 is a point at which changing is to be made upwardly to the next changing point P3. Therefore, a changing direction at the changing point P2 becomes an upward direction (t) as illustrated in FIG. 5B. Similarly, at a changing point P3, the changing direction becomes an upward direction (↑) till the next changing point P4. The changing direction at the changing point P4 becomes a downward direction (↓) different from the above described changing directions. How to store data of the directions is represented by FIG. 5C provided that, for example, "1" represents data indicating the upward direction and "0" represents data indicating the downward direction. In this case, the number of pieces of data to be stored is equal to the number of changing points. Namely, when there are m pieces of changing points, the bit number to be stored is also m bits.

A scanning line 302 in FIGS. 3A and 3B represents an actual scanning line in which the inclination and the bending occur due to a positioning accuracy and shifting of a diameter of the photosensitive member 22 and a positioning accuracy of the optical system in the scanner unit 24 (24C, 24M, 24Y, and 24K) of each color illustrated in FIG. 2. The profile characteristics of the image forming apparatus differ between the recording devices (i.e., recording engines). In a case of the color image forming apparatus, the characteristics differ according to colors.

The changing point in an area where the laser scanning direction is shifted upwardly is described below with reference to FIG. 3A.

The changing point according to the present exemplary embodiment is a point at which the scanning line is shifted by one pixel in the sub-scanning direction. In other words, in FIG. 3A, points P1, P2, and P3, as points at which the scanning line is shifted by one pixel in the sub-scanning direction, are the changing points on the upward bending characteristics 302. In FIG. 3A, a point P0 is shown as a reference point. As seen from FIG. 3A, a distance between the changing points (e.g., L1 and L2) becomes shorter in the area in which the bending characteristics 302 drastically changes, whereas becomes longer in the area in which the bending characteristics 302 gradually changes.

The changing point in an area where the laser scanning direction is shifted downwardly is described below with reference to FIG. 3B. In the area representing the characteristics that the pixel is shifted downwardly, the changing point is also defined as a point at which the scanning line is shifted by one pixel in the sub-scanning direction. In FIG. 3B, points Pn and Pn+1, at which the scanning line is shifted by one pixel in the sub-scanning direction on the downward bending characteristics 302, are the changing points. In FIG. 3B, similar to FIG. 3A, a distance (e.g., Ln, and Ln+1) between the changing points becomes shorter in the area in which the bending characteristics 302 drastically changes, whereas becomes longer in the area in which the bending characteristics 302 gradually changes.

As described above, the changing point tightly relates to a degree of variation in the bending characteristics 302 of the image forming apparatus. Consequently, the number of changing points becomes larger in the image forming apparatus having the drastic bending characteristics, whereas, the number of changing points becomes smaller in the image forming apparatus having the gradual bending characteristics.

As described above, the bending characteristics of the image forming apparatus differs according to color planes (i.e., image recording units) of the colors C, M, Y, and K, so that the number of changing points and positions thereof differ from each other. The difference between colors induces the misregistration (i.e., color misregistration) in the image formed by transferring the toner images of all colors on the intermediate transfer member 28.

Processing performed by the image processing unit 102 in the color image forming apparatus is described below with reference to FIG. 1. An image generation unit 104 generates printable raster image data based on print data (i.e., page description language) received from a computer apparatus or the like (not illustrated). The image generation unit 104 outputs the generated data on a pixel to pixel basis as red-blue-green (RGB) data and attribute data indicating a data attribute of each pixel. The attribute data includes attributes as to characters, thin lines, computer graphics (CG), natural images, and the like. The image generation unit 104 may be configured to treat not image data received from the computer apparatus or the like but image data received from a reading unit installed within the color image forming apparatus.

The reading unit here includes at least a charge coupled device (CCD) or a contact image sensor (CIS). The reading unit may be configured to include, in addition to the CCD or the CIS, a processing unit for performing predetermined image processing on the read image data. Alternatively, the processing unit may be configured not to be included in the color image forming apparatus but may be configured to receive data from the reading unit via an interface (not illustrated).

A color conversion unit 105 converts the RGB data into cyan-magenta-yellow-black (CMYK) data according to toner colors of the image forming unit 102. The color conversion unit 105 stores the CMYK data and attribute data thereof in a storage unit 106 including a bitmap memory. The storage unit 106 is a first storage unit included in the image processing unit 102 to temporarily store the raster image data for performing printing. The storage unit 106 may include a page memory for storing image data corresponding to one page or a band memory for storing data corresponding to a plurality of lines.

Halftone (HT) processing units 107C, 107M, 107Y, and 107K subject image data of each color output from the storage unit 106 to halftoning processing in order to convert input gradations of the image data into a pseudo-halftone expression. At the same time, the HT processing units 107C, 107M, 107Y, and 107K perform the interpolation processing, i.e., the changing less than one pixel. According to the halftoning processing, the number of gradations is reduced. In the interpolation processing performed by the HT processing unit 107, pixels before and after the changing point corresponding to the bending characteristics of the image forming apparatus are used. The interpolation processing and the halftoning are described below in detail.

A second storage unit 108 is installed in the image forming apparatus. The second storage unit 108 stores N-value-processed data processed by the HT processing unit 107 (i.e., HT processing units 107C, 107M, 107Y, and 107K). The bit number of the N-value-processed data is less than the bit number of the image data of the colors C, M, Y, and K. If the pixel position to be subjected to the image processing in and after the storage unit 108 is the changing point, the changing by one pixel is performed at a time when target image data is read out from the storage unit 108. The detail of the changing by one pixel performed in the storage unit 108 is described below. In the present exemplary embodiment, the first storage unit 106 and the second storage unit 108 are configured independently. However, the first storage unit 106 and the second storage unit 108 may be configured as a common storage unit within the image forming apparatus.

Figure 12A:
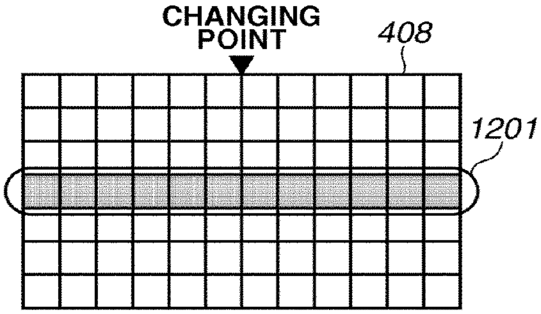
FIGS. 12A through 12C schematically illustrate a state of data stored in a storage unit.
Figure 12B:
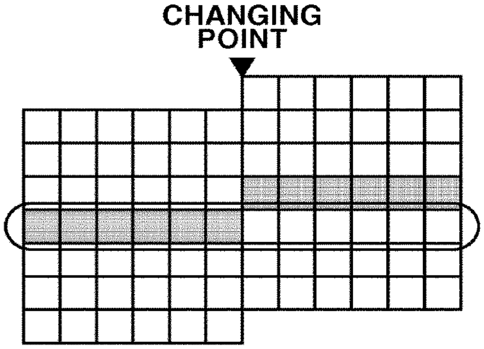
Figure 12C:
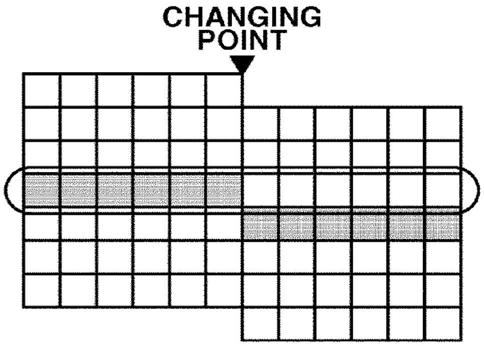

FIG. 12A schematically illustrates a state of data stored in the storage unit 108. As illustrated in FIG. 12A, in the state that the data is stored in the storage unit 108, data after processed by the HT processing unit 107 is stored in the storage unit 108 regardless of the changing direction or the bending characteristics of the image forming unit 101. When a line 1201 illustrated in FIG. 12A is read out and if the profile characteristics as a direction to be corrected by the image processing unit 102 is an upward direction, the line is shifted upwardly by one pixel at a boundary of the changing point as illustrated in FIG. 12B. When image data of the line 1201 is read out from the storage unit 108 and if the profile characteristics as a direction to be corrected by the image processing unit 102 is a downward direction, the line is shifted downwardly by one pixel at a boundary of the changing point as illustrated in FIG. 12C.

A pulse width modulation (PWM) 113 converts image data of each color read out from the storage unit 108 after the image data is subjected to the changing by one pixel into an exposure time of the corresponding one of the scanner units 115C, 115M, 115Y, and 115K. The converted image data is output from a print unit 115 of the image forming unit 101.

With reference to FIGS. 5A through 5C, the profile characteristic data as described above is stored in the image forming unit 101 of the image forming apparatus as a characteristics of the image forming apparatus. The image processing unit 102 processes the profile characteristic data according to the profile characteristics (i.e., profiles 116C, 116M, 116Y, and 116K) stored in the image forming unit 101.

An operation of the HT processing unit 107 (107C, 107M, 107Y, and 107K) of the image processing unit 102 is described below in detail with reference to FIG. 6. Since the configurations of the HT processing units 107C, 107M, 107Y, and 107K are identical to each other, the HT processing unit 107 is singularly used below for the purpose of description.

The HT processing unit 107 receives image data of the corresponding color from the CMYK data and transfers the image data to a screen processing unit 601.

The screen processing unit 601 receives the image data. The screen processing unit 601 subsequently performs the halftoning by screen processing on the image data to convert the continuous tone image into an area gradation image having less number of gradations.

The screen processing is performed in the HT processing unit 107 by using the dither method. More specifically, an arbitrary threshold is read out from a dither matrix in which a plurality of thresholds is placed and is compared with the input image data, so that the image data is converted into the N-value-processed image data.

Figure 13A:
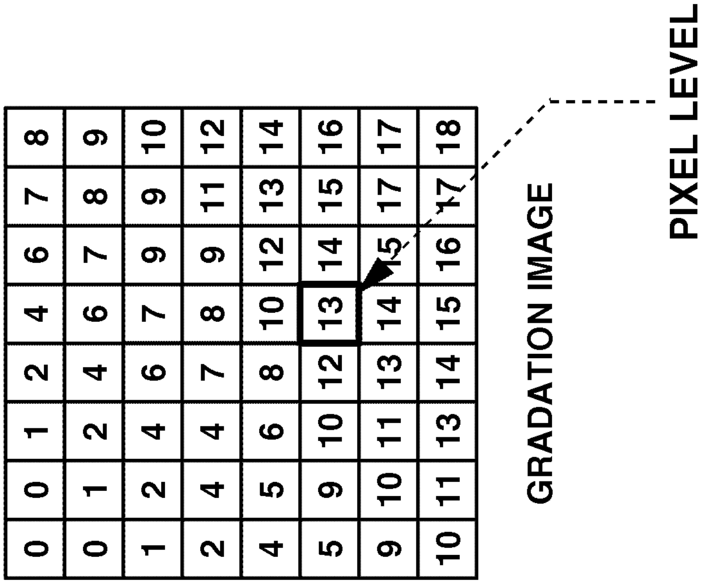
FIGS. 13A through 13C illustrate a principle of screen processing according to the dither method.
Figure 13B:
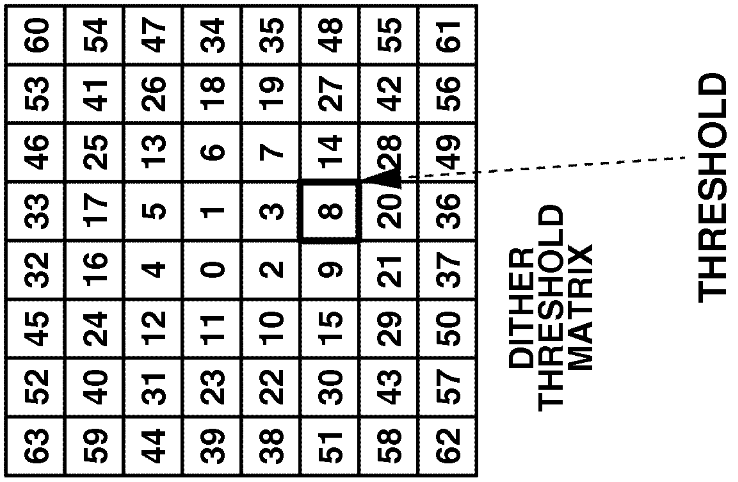
Figure 13C:
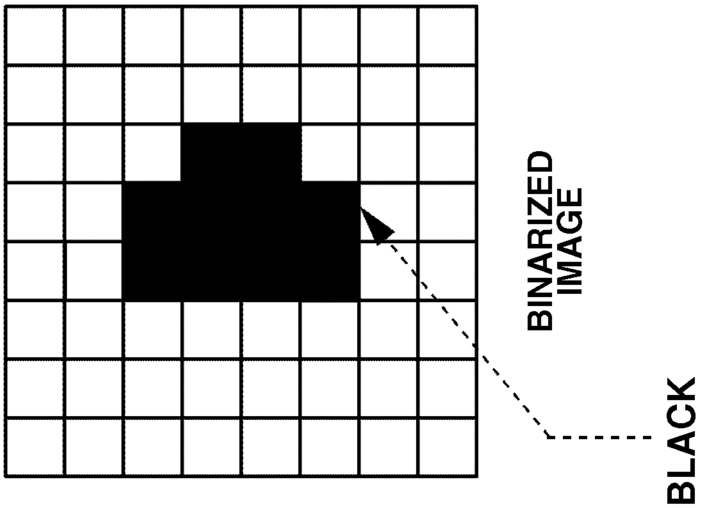

The principle of the dither method is described below in detail with reference to FIGS. 13A, 13B, and 13C. FIG. 13A shows the gradation values of the pixels in the image. FIG. 13B shows the threshold values of the corresponding pixels. FIG. 13C shows the resulting binarization. Binarization is described below for the sake of a simple description. The input continuous tone image (e.g., an 8-bit 256-gradation image) is divided into N×M blocks (i.e., 8×8 blocks in FIG. 13). Subsequently, the gradation values of the pixels within the blocks are compared in size with the threshold in the dither matrix, in which the N×M thresholds having the same sizes are arranged, on a pixel to pixel basis. If, for example, the pixel value is greater than the threshold, a value of 1 is output, whereas, if the pixel value is equal to or less than the threshold, a value of 0 is output. The above conversion is performed on all the pixels for each size of the matrix, thereby enabling the binarization of the entire image.

In the color image forming apparatus using the electrophotographic method, the dither matrix in which dots are concentrated is cyclically used in order to realize stable dot reproducibility on the recording medium. To the contrary, if the dots are diffused or the number of isolated dots around which there is no dot increases, the stable dot reproducibility cannot be acquired. A distance between the dots is narrower in a case of a screen including the larger number of screen lines, whereas the distance between the dots is wider in a case of a screen including the smaller number of screen lines.

Figure 14A:
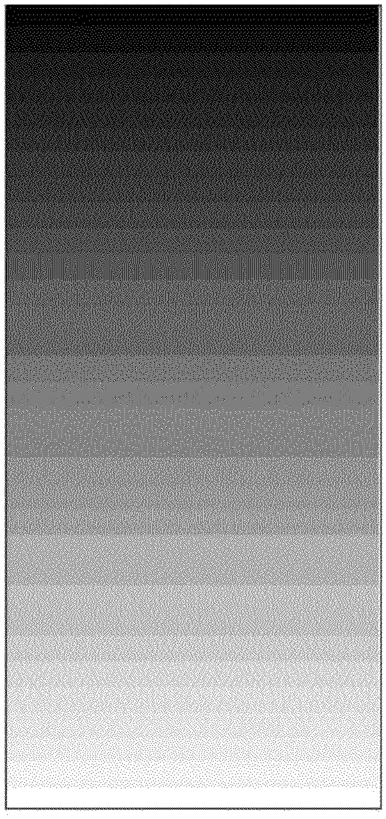
FIGS. 14A and 14B schematically illustrate a state of input/output of an image by the dither method.
Figure 14B:
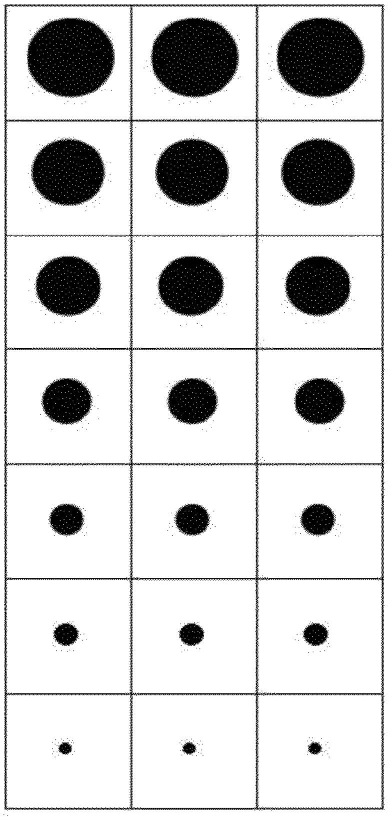
Figure 15A:
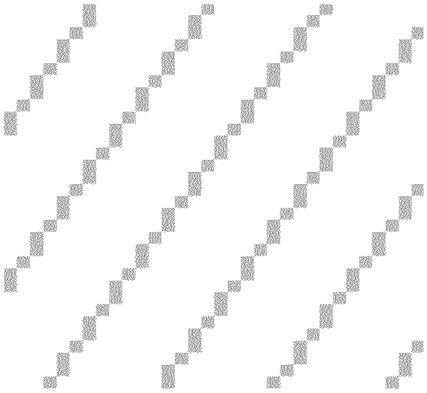
FIGS. 15A through 15E illustrate examples of screen patterns according to a second exemplary embodiment.
Figure 15B:
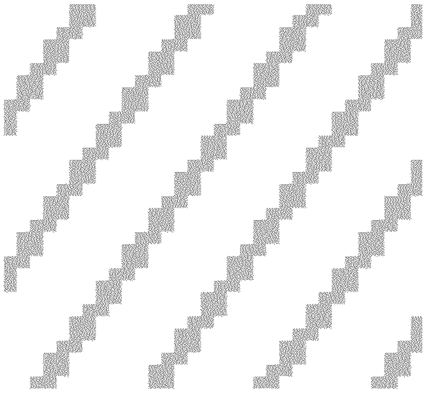
Figure 15C:
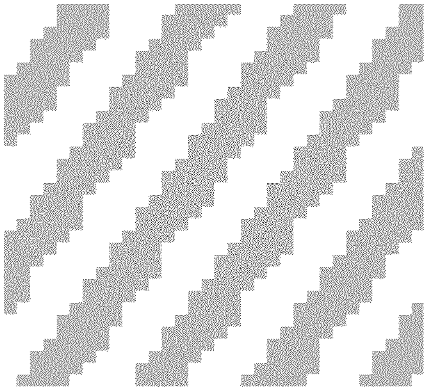
Figure 15D:
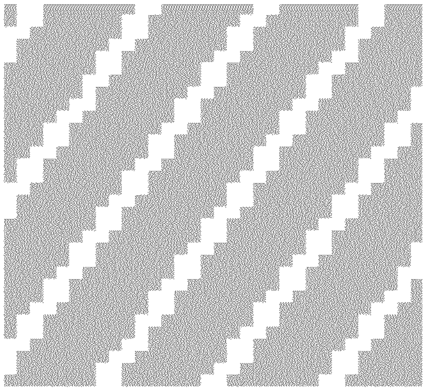
Figure 15E:
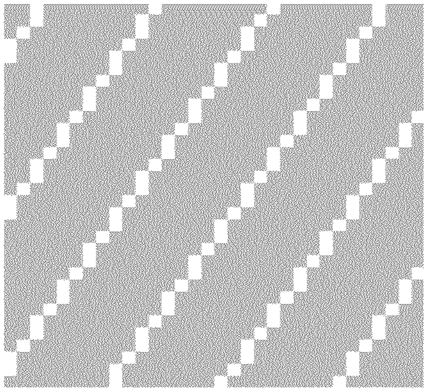

FIGS. 14A and 14B are schematic views illustrating the above state. A continuous gradation image as illustrated in FIG. 14A is expressed as a binary image as illustrated in FIG. 14B.

Generally, if the state of the image changes from a low density to a high density according to a cycle of the screen, a dot is started to be generated and subsequently another dots around the dot are started to be generated. The dots are generated while the dots are concentrated as described above. Accordingly, a stable dot formation can be realized. The less the dots are concentrated, the fewer dots are isolated. Therefore, a stable gradation can be expressed. The screen is formed in the order of generation of the dots to express an intermediate density.

Figure 6:
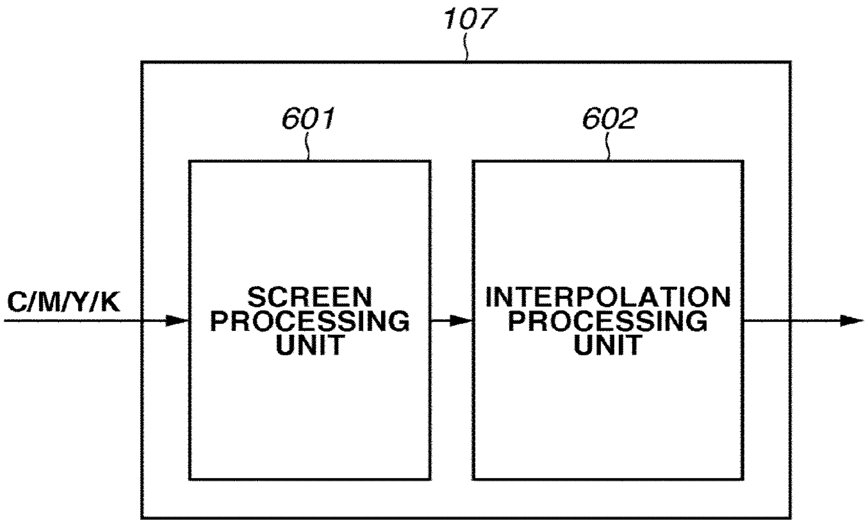
FIG. 6 is a block diagram illustrating a configuration of a halftone (HT) processing unit according to a first exemplary embodiment.
Figure 7:
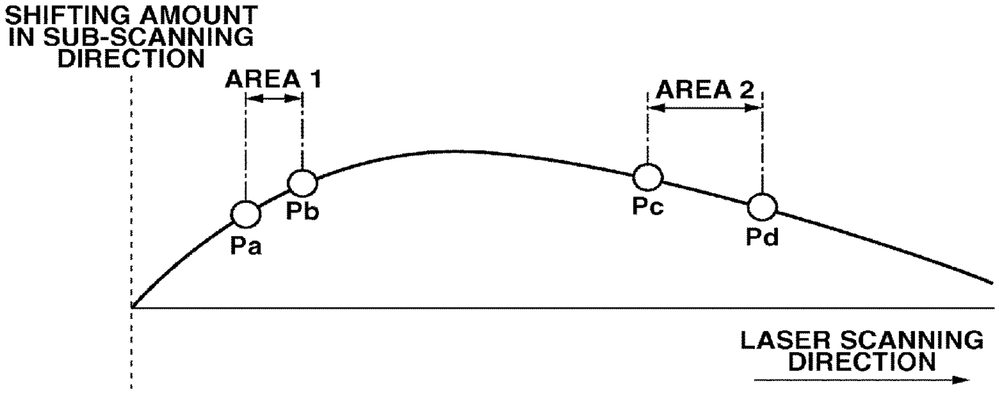
FIG. 7 illustrates an example of changing points and interpolation processing areas.

An interpolation processing unit 602 illustrated in FIG. 6 is described below in detail with reference to FIG. 7. FIG. 7 illustrates the bending characteristics of the image forming apparatus with respect to the laser scanning direction. An area 1 is an area to be corrected by the image processing unit 102 in the downward direction. An area 2 is an area to be corrected by the image processing unit 102 in the upward direction.

Figures 8A, 8B, 8C, 8D:
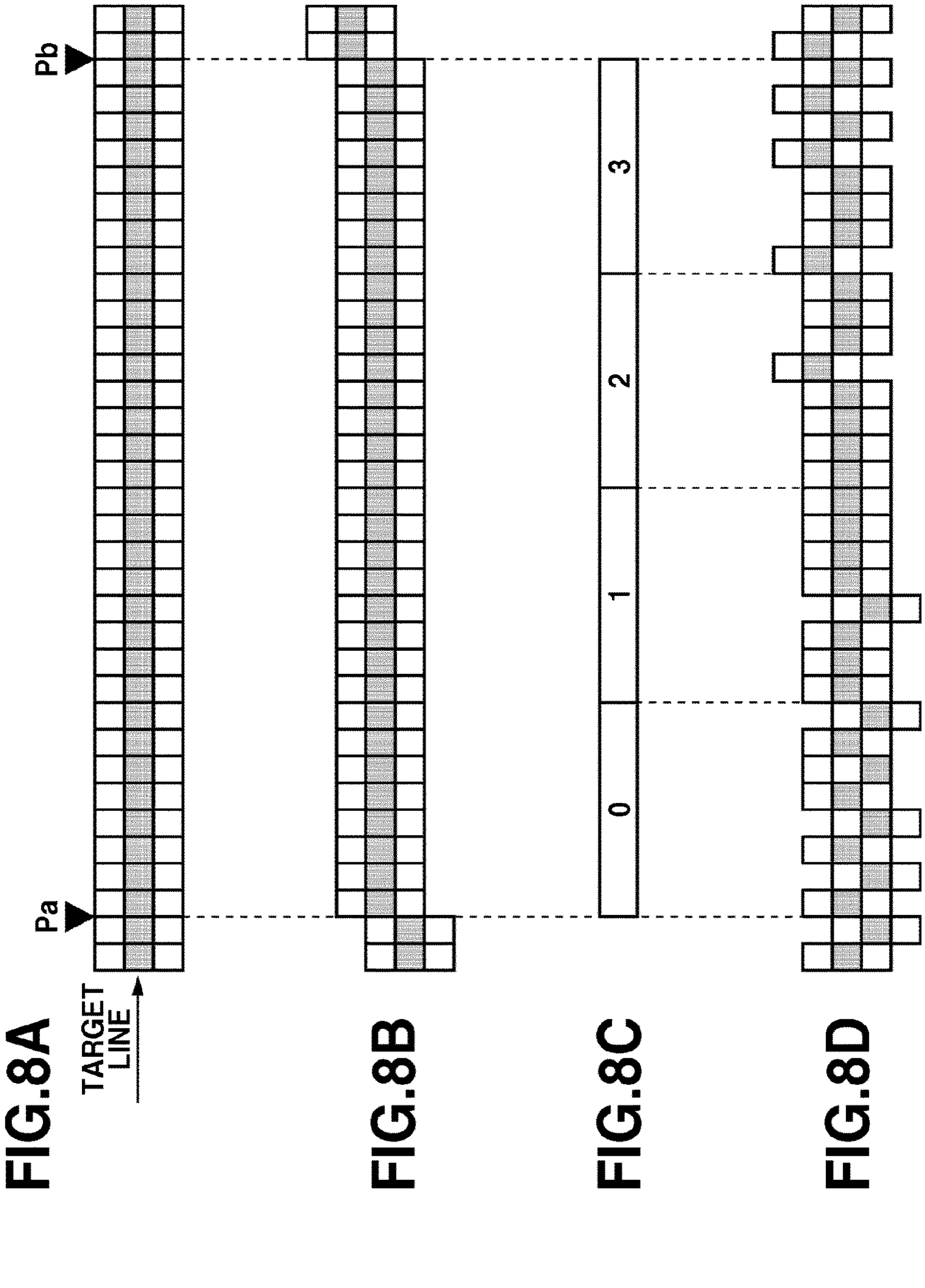
FIGS. 8A through 8D schematically illustrate processing relating to changing of a pixel.

FIG. 8A illustrates pre-changed images before and after the changing point Pa in FIG. 7, i.e., an output image data configuration of the halftoning processing unit 107. A target line is a center line of three lines of image data illustrated in FIG. 8A. The changing processing of more than one pixel is performed at a time of reading the image data from the storage unit 108 at the changing point. Therefore, if the step is not filled, as illustrated in FIG. 8, a large step corresponding to one pixel appears at a boundary of the changing point Pa in the configuration of the pixels before and after the changing point Pa.

Figure 21:
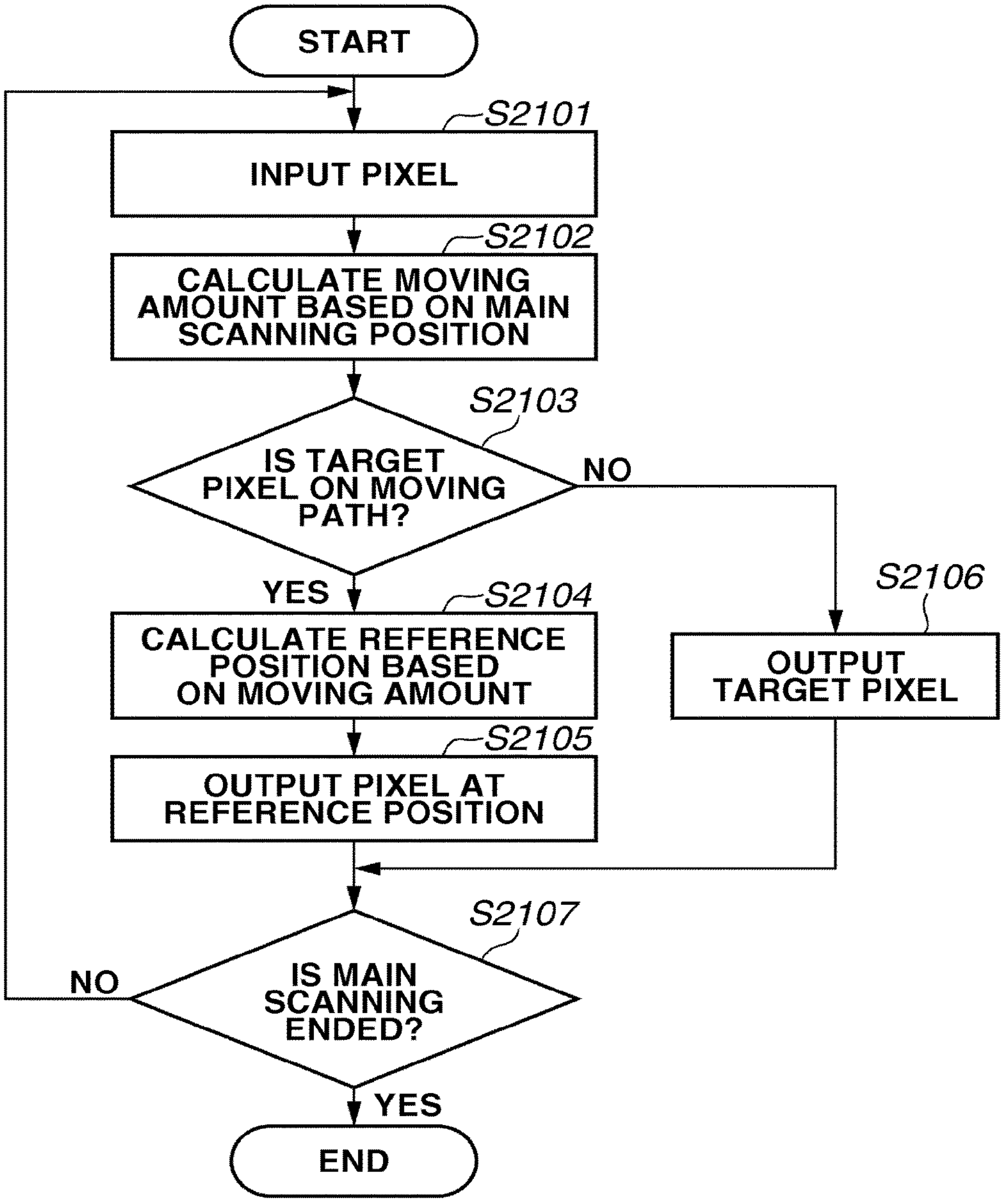
FIG. 21 is a flow chart illustrating processing relating to interpolation processing of pixels.

Therefore, the interpolation processing is performed in order to fill the step. FIG. 21 is a flow chart illustrating the interpolation processing. In step S2101, a target pixel is input into the interpolation processing unit 602. In step S2102, a distance from the changing point is calculated from a main scanning position of the pixel and thus a size and a shifting amount to be interpolated at the position are determined. For this calculation, the distance between the changing points is divided into n areas.

In the description here, for example, as illustrated in FIG. 8C, the distance between the changing points is divided into four areas and the four sectional areas are defined. The areas are named an area 0 through an area 3 in the order starting from the leftmost changing point. Under the condition, ideal shifting amounts are defined as −3/8 pixel in the area 0, −1/8 pixel in the area 1, +1/8 pixel in the area 2, and +3/8 pixel in the area 3. The above data shifting enables a smooth interpolation. Since the shifting amount is a value less than one pixel, the shifting is a virtual pixel gravity center movement. This is referred to as the interpolation. As described above, since the pixels are partially shifted (i.e., one pixel or three pixels in the above example) among a plurality of pixels (i.e., eight pixels) included in the above area, the correction (i.e., gravity center movement of the image) of less than one pixel can be realized in the above area in a macro perspective view.

In step S2103, a determination is made as to whether the target pixel is the pixel to be shifted and, if the pixel is on the moving locus (YES in step S2103), the shifting of the pixel data is performed.

An interpolation of +1/8 pixel of the area 2 is exemplified as a specific method for shifting the image. As described above, in this area, the gravity center of the image data may be shifted only by 1/8 of one pixel in the sub-scanning direction, so that the image data is cyclically shifted once in eight pixels which are continuous in the main scanning direction.

Further in this area, the image data is required to be raised in a plus (+) direction i.e., in the upward direction. Therefore, in step S2104, the pixel on the moving locus refers to one pixel immediately below itself to output it. Thus, in step S2105, the image data can be raised. To the contrary, in a case of the shifting in a minus (−) direction, i.e., in the downward direction, the pixel on the moving locus refers to one pixel immediately above itself.

In step S2106, with respect to seven pixels among eight pixels which are not on the moving locus, a value of the target pixel itself is output.

In step S2107, the above processing is performed with respect to all the pixels in the main scanning direction. The interpolation amount is switched according to areas, which enables smoothing (obscuring) the steps generated in the changing.

Figure 9A:
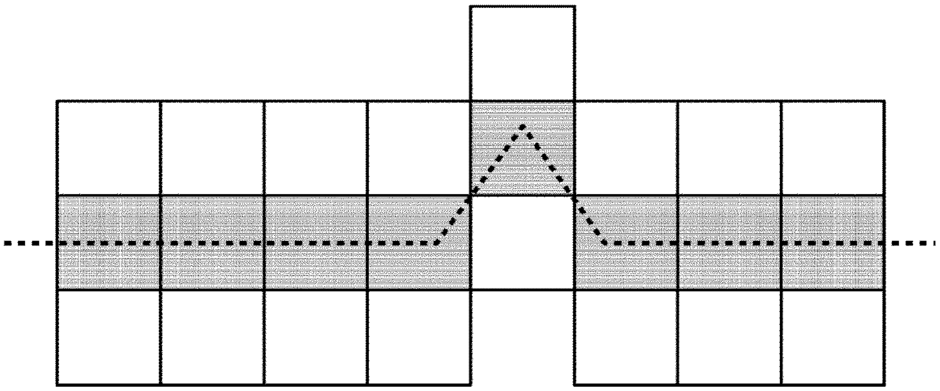
FIGS. 9A through 9C schematically illustrate processing relating to interpolation of a pixel.
Figure 9B:
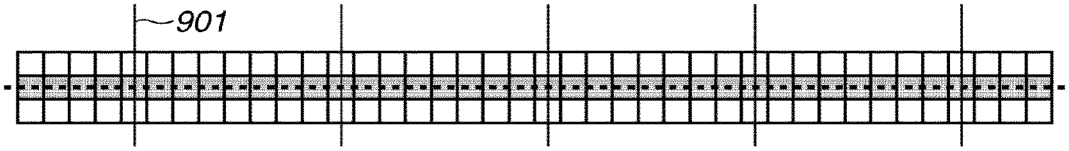
Figure 9C:
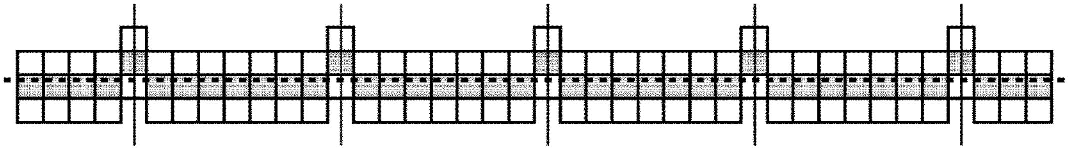

FIGS. 9A through 9C illustrate the above state. FIG. 9B illustrates a state before the interpolation processing. FIG. 9C illustrates a state after the interpolation processing. A gravity center of the line is illustrated with a dashed line. FIG. 9A is an enlarged view of FIG. 9C. A vertical line 901 in FIG. 9B shows a moving locus which appears every eight pixels.

At the micro level as illustrated in FIG. 9A, there appears to be a bump because of the step corresponding to one pixel. At the macro level as illustrated in FIG. 9C, the gravity center of the line appears to be raised upwardly by +1/8 pixel. The step corresponding to one pixel that appears cyclically according to the shifting would be ignored in a case of an image having a high resolution such as, 1200 dpi, in which one pixel is small enough. As described above, the number of pixels to be shifted is varied in a manner as illustrated in FIG. 8D. As a result thereof, the data can be gradually shifted. In other words, in the above processing, the gravity center of image density reproduced by the image data is gradually shifted.

However, a cyclic shifting of the pixel exemplified as the shifting of once in eight pixels destroys a pattern of the screen since interference occurs with the cyclic pattern of the screen obtained in the screen processing performed in advance. Therefore, the moving locus needs to be determined in view of a screen cycle.

Figure 10A:
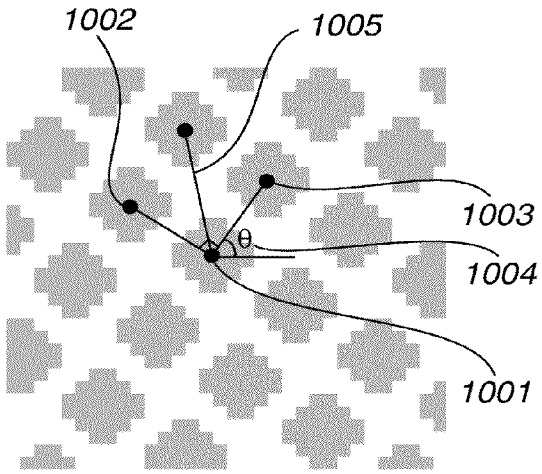
FIGS. 10A through 10D schematically illustrate a state of shifting of positions of the gravity centers of dots.
Figure 10B:
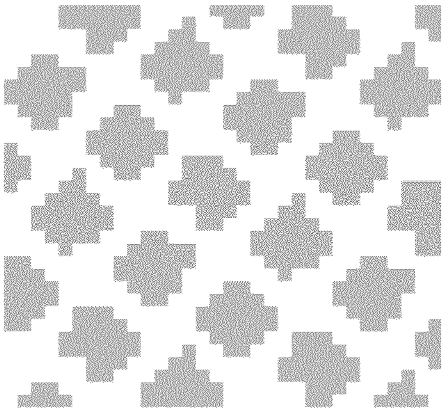

FIG. 10A illustrates an example of the screen pattern. The screen represents a tetragonal pattern in which dot positions are orthogonal to each other at 90 degrees and apart from each other at regular intervals. More specifically, a distance between a dot 1001 and a dot 1002 and a distance between the dot 1001 and a dot 1003 are equal and a line segment of the dot 1001 and the dot 1002 and a line segment of the dot 1001 and the dot 1003 are perpendicular to each other. A screen angle of this screen is as an angle 1004. If the pixel is cyclically shifted as described above with respect to the image of the screen, the screen pattern is destroyed as illustrated in FIG. 10B. As a result thereof, an interference pattern appears and gradation unevenness occurs.

Figure 10C:
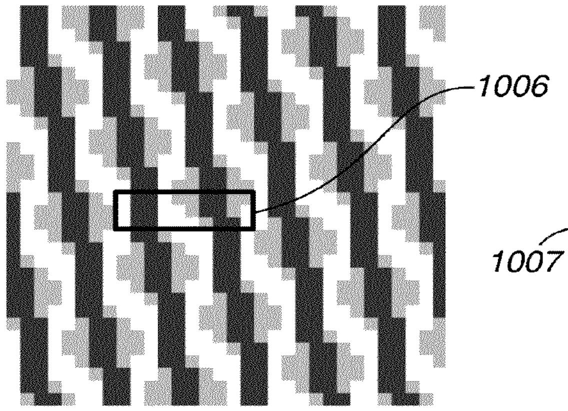

Exemplified is a case that a pixel is shifted upwardly by one pixel for every eight pixels. As described above, each dot changes its shape discontinuously. As illustrated in FIG. 10C, the moving locus that synchronizes the cycle of the screen is determined. Thick black lines in FIG. 10C indicate moving loci. As described above, the moving loci do not always extend vertically but is narrowed down to some degree by the number of lines in the screen, angles, and an order of dot growth.

Figure 10D:
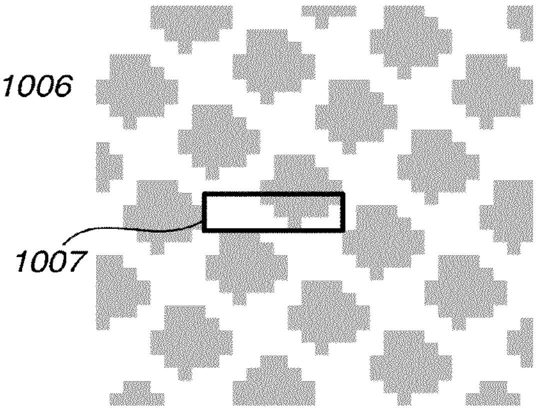

In the screen of FIG. 10A, a direction 1003 from a screen angle θ, a direction 1005 shifted from the direction 1003 by 45 degrees, and a direction 1002 shifted from the direction 1003 by 90 degrees are regarded as paths, respectively. As a result thereof, destruction of the dot pattern can be minimized. In the present example, a position shifted from the screen angle by 45 degrees is regarded as the path. When image data on the moving locus is shifted upwardly, an image illustrated in FIG. 10D is output. In this case, a change occurs in each dot that only one pixel is shifted. The same change occurs in all the dots in the entire density area. Accordingly, the above described interference between the screen cycle pattern and the shifting cycle can be eliminated or be suppressed. In other words, the interference pattern comes to be less-visible and the density unevenness hardly appears.

Figure 11A:
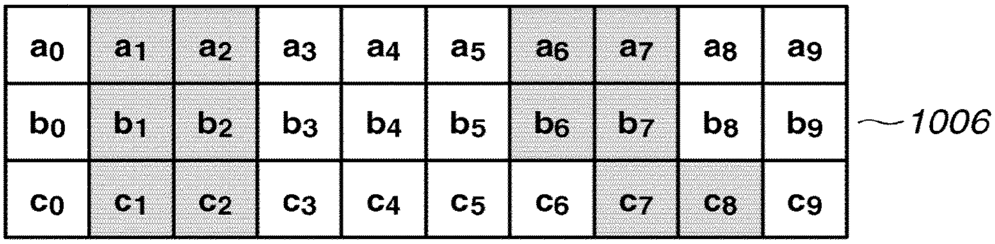
FIGS. 11A through 11C illustrate a state of shifting of pixels of image data on a moving locus.

When the image data is determined to shift on this path, a shiftable amount is naturally determined. FIG. 11A illustrates an enlarged view of a portion 1006 in FIG. 10C. As it is illustrated, shiftable pixels appear in a cycle of two pixels in five pixels in the main scanning direction. In other words, a combination of the screen patterns in FIGS. 10A through 10D and the paths thereof enables the shifting up to two pixels in five pixels.

Thus, in a case of the interpolation processing performed by using the moving locus, the scanning line is divided into five steps such as −2/5, −1/5, 0/5, +1/5, and +2/5. The above described number of divided areas is also five. As described above, the distance between the changing points is divided into five areas and the above described number of pixels is shifted in each area, thereby enabling the interpolation of the steps.

Figure 11B:
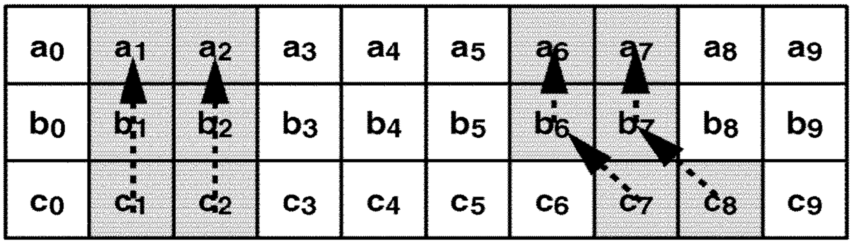
Figure 11C:
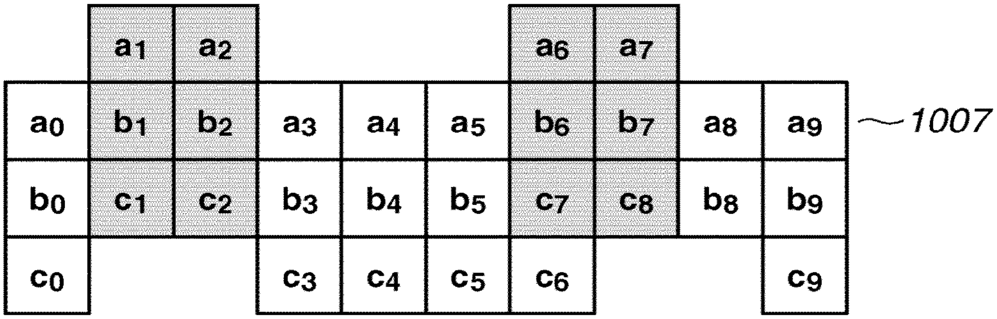

FIGS. 11A through 11C illustrate a relationship between input and output as described above. Each pixel is provided with a symbol such that the shifting of the pixel can be seen. For showing the inputting, the moving locus is colored in gray in a state that the pixels are arranged as illustrated in FIG. 11A. An output as illustrated in FIG. 11C can be acquired as a result that the pixels are shifted along the moving locus in a manner as illustrated in FIG. 11B. The results in FIG. 11C correspond to a portion 1007 in FIG. 10D. In a narrow sense, an oblique shifting is included in the shifting of the pixels. However, in this case, a satisfactory effect can be produced when the pixel is regarded to be shifted upwardly by about 2/5 pixel.

FIG. 21 is the flow chart for realizing the correction (i.e., interpolation) of the deviation with respect to an ideal scanning line in a unit smaller than one pixel (i.e., less than one pixel) by causing the pixel to shift on the moving locus according to the screen cycle. Since processing performed in steps S2101 and S2102 is similar to what described above, a description thereof is omitted here.

In step S2103, a determination as to whether the target pixel is on the moving locus according to the screen cycle can be made by using the above described dither matrix as follows. The path is defined based on the dither matrix and whether the target pixel is on the moving locus is determined by using the matrix.

FIGS. 20A through 20D illustrate a specific example of the above described determination using the area where the +2/5 pixel shifts. If a target pixel position 2001 is on the moving locus in FIG. 20A, 1 or 2 is inserted in a moving locus matrix, and if not, 0 is inserted in the moving locus matrix. Thus, the moving locus matrix is generated. FIG. 20B illustrates the moving locus matrix. Since the target pixel position 2001 on the moving locus matrix represents 2, the target pixel is determined as being on the moving locus. As described above, a determination can be made as to whether the target pixel is on the moving locus.

Then in step S2104, a reference position is subsequently calculated. Since the pixel is shifted in a plus (+) direction according to the interpolation processing, the image is required to be raised upwardly, i.e., the data is required to be raised from a line below the target pixel position. In step S2105, the data having the same matrix value is to be raised. In this case, since the matrix value at the position of the target pixel position is 2, a position 2002 indicating the matrix value of 2 in the line below the target pixel position is referred to and is raised up. As a result thereof, the shifting is shown as illustrated in FIG. 20C and thus the output is shown as illustrated in FIG. 20D.

In step S2106, if the target pixel position on the matrix has the matrix value of 0, the value of the target pixel is output as it is without providing any processing thereto. In the present exemplary embodiment, an operation in the area in which the pixel is shifted in the plus (+) direction is exemplified. However, in a case where the pixel is moved in the minus (−) direction, data in an upper line is lowered. Further, the area in which 2/5 pixel is shifted is exemplified. However, in a case of the area in which the pixel is shifted by 1/5 pixel, a shifting data amount can be set to 1/5 pixel by shifting the pixel, for example, only when the matrix value is 1.

Generally, since the number of lines and the angle differs from each of the colors C, M, Y, and K, the dither matrix, the number of division of the area, the moving loci, and the matrix indicating the loci need to be set separately suitably for each color.

As described above, when the dither method that is the gradation processing having a cycle pattern is used, since the moving locus is defined according to the screen cycle to shift the pixels, a gravity center movement of an image is achieved according to the interpolation processing without involving the density unevenness and the destruction of the screen pattern in halftoning processing. Accordingly, a step generated by the changing according to a geometric correction of the image can be made less noticeable without adversely effecting to the gradation.

According to the present exemplary embodiment, when an image defect due to the misregistration is corrected by digital image processing, the density unevenness and the generation of step corresponding to one pixel generated at the changing point can be suppressed with respect to the portion subjected to the screen processing, so that a suitable correction can be performed.

According to the moving locus synchronized with the cycle of the image data generated by the screen processing, the interpolation processing for shifting pixels is performed. Accordingly, the correction of the step corresponding to one pixel can be realized throughout a plurality of steps while maintaining the gradation properties without inducing the destruction of the screen pattern.

In the first exemplary embodiment, the dot growth screen in which the density increases while the dots gradually become larger is exemplified. In the dot screen, the moving locus is defined such that the change in the shifting of the pixel is minimized. However, occurrence of a minute change of a shape of the dots is not avoidable according to the density area.

In a second exemplary embodiment, an example that a screen pattern does not change at all in any one of density areas is described using an example of a line growth screen. In the present exemplary embodiment, a modified example of the HT processing unit 107 is described in detail. However, since the description before and after the processing is equal to that of the first exemplary embodiment, a description there is omitted here.

The second exemplary embodiment is described in detail below with reference to FIGS. 15A through 15E. In the present exemplary embodiment, similar to the first exemplary embodiment, a screen processing unit 601 receives image data and performs halftoning according to the screen processing to convert the continuous tone image into the area gradation image including less number of gradations. In the screen processing performed in the HT processing unit 107, the dither method is performed. More specifically, an arbitrary threshold is read out from a dither matrix in which a plurality of thresholds is placed and is compared with the input image data, so that the image data is converted into the N-value-processed image data. This processing is also similar to that of the first exemplary embodiment.

In the first exemplary embodiment, the dither matrix in which the dots are concentrated is cyclically used. However, in the present exemplary embodiment, the line growth screen is exemplified. As illustrated in FIGS. 15A through 15E, the density gradually reaches a higher density. In the printer using the electrophotographic method, the line screen in which dots come to extend to form a line shape shows more stable gradation properties than that of the dot screen illustrated in the first exemplary embodiment. Since the dots are formed into the line shape at the stage of a thin density, there is less number of dots which are unstable and isolated in principle. However, the line shape has more cyclic directionality than dots, so that tendencies of a visible texture of the screen and interference moire and jaggies appear more than those in the case of dots because images of the colors C, M, Y, and K are superimposed one another.

A description as to the interpolation processing follows. The area division between the changing points and the cyclic shifting of the pixel data are similar to those of the first exemplary embodiment, so that descriptions thereof are omitted here. A method for defining the moving locus is described below in detail. In a case of the screen in which line growth is generated, the moving locus can be set so as to completely orient to a direction of the line growth. To the contrary, the moving locus is defined in advance and the dither matrix is defined so as to allow the dots to grow on the moving locus, thereby enabling to minimize an adverse effect to the screen.

Figure 16A:
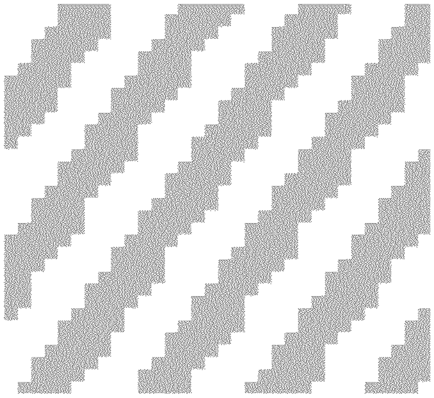
FIGS. 16A through 16E illustrate the screen patterns and moving loci thereof according to the second exemplary embodiment.
Figure 16B:
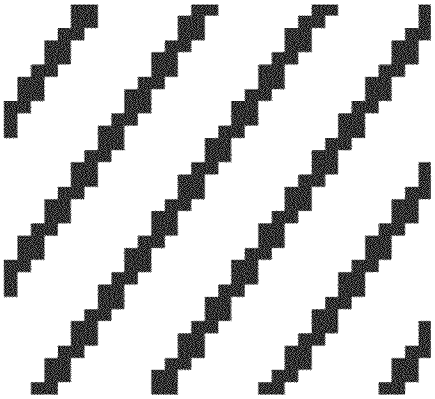
Figure 16C:
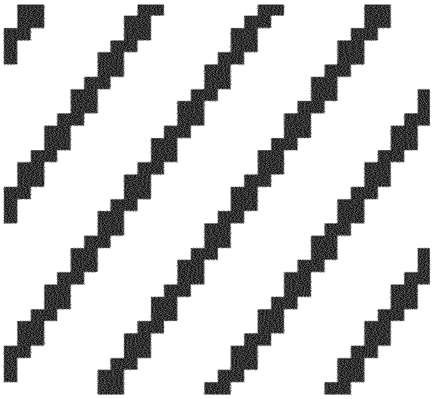

The number of screen lines and the angles are defined from the dither matrix used with respect to the image formed into the one as illustrated in FIG. 16A. The moving locus is defined based on a cycle itself of the number of lines and a cycle that is shifted a half phase from the above cycle as illustrated in FIGS. 16B and 16C. In other words, the moving locus can be defined by the cycle twice as the cycle defined by the number of screen lines. The growth progresses as follows. Lighting of dots starts on the moving locus of the cycle of the number of lines. Then, screen grows to fill the dots along the moving locus shifted latter half from the above moving locus.

Figure 16D:
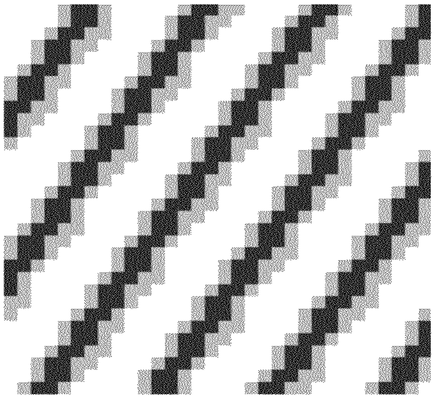
Figure 16E:
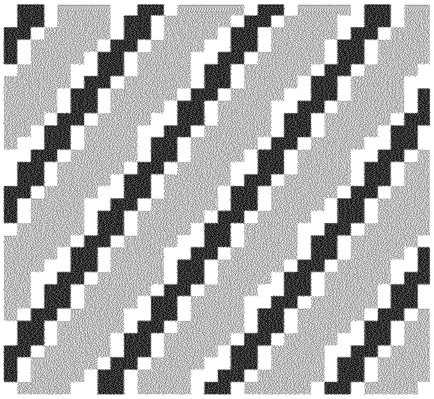

The above described order of growth of the screen and moving loci are defined. In FIGS. 16A through 16E, the gravity center can be shifted in a range between −4/8 pixel and +3/8 pixel at one cycle of the screen. Thus, as far as at least within the illustrated density area, no change occurs in the screen pattern. FIG. 16D illustrates a screen pattern of a combination of the screen pattern illustrated in FIG. 16A overlaid with a moving locus illustrated in FIG. 16B. Similarly, FIG. 16E illustrates a screen pattern of a combination of the screen pattern illustrated in FIG. 16A overlaid with a moving locus illustrated in FIG. 16C. As illustrated in FIGS. 16D and 16E, colors of all the pieces of data on the moving locus are black or white, and no actual change of the screen pattern of the gradation unit occurs in this density.

The present exemplary embodiment basically has the configuration similar to that of the first exemplary embodiment excepting for ideas as to the definition of the dither matrix and the definition of the moving locus. As described above, even in a case where the dither which progresses into a line shape is used in all the types of screens, tolerability against image deterioration caused due to shifting of pixel data can be enhanced.

In the above exemplary embodiments, the one bit screen which expresses the gradation with ON/OFF is exemplified. However, the moving locus can be defined and realized according to the screen patterns also with respect to a multi-bit screen involving the PWM control. In a case of an apparatus which employs the PWM control and can express a pixel smaller than one pixel, a step is provided with a pseudo-control in which the step can have a resolution higher than that the apparatus originally has if the resolution is decreased after performing the changing interpolation with the resolution higher than that the apparatus originally has.

In a third exemplary embodiment, exemplary processing that the resolution is decreased after the changing and the interpolation processing are performed with the resolution twice as the resolution of the apparatus is described below using the dot screen of the first exemplary embodiment.

In the present exemplary embodiment, the HT processing unit 107 is described in detail. However, since the processing before and after the processing of the HT processing unit 107 is equal to that performed in the first exemplary embodiment, a description thereof is omitted here.

Figure 17:
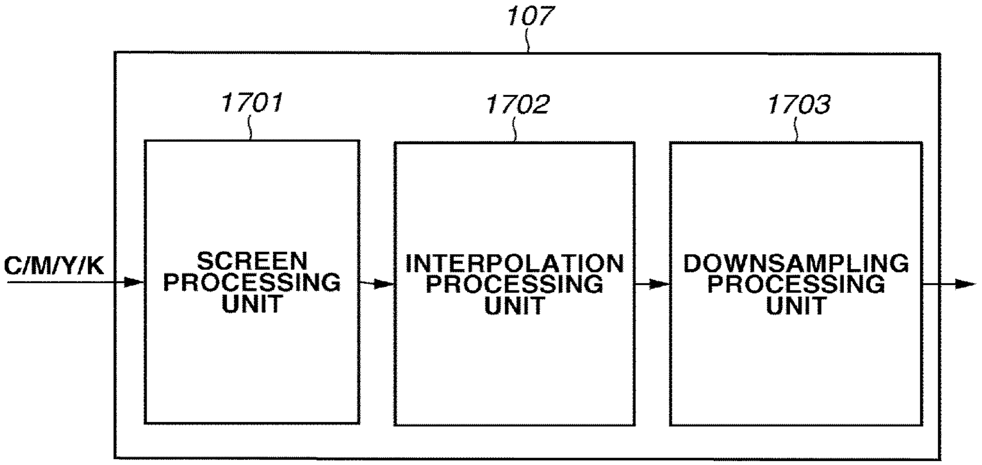
FIG. 17 is a block diagram illustrating the configuration of the HT processing unit according to a third exemplary embodiment.

FIG. 17 illustrates a detailed block diagram of the HT processing unit 107. The configurations of a screen processing unit 1701 and an interpolation processing unit 1702 are similar to the configurations thereof in the first exemplary embodiment. Image data obtained after the interpolation processing is one bit (0 to 1) data having a resolution twice as the resolution of the apparatus. In a downsampling processing unit 1703, the image data is converted into four bits (0 to 15) data having half the resolution thereof. In this method, total four pixels, i.e., 2×2 pixels, may be sampled into one pixel. More specifically, in this method, a total value of the four pixels is calculated and the total value is multiplied by 15/4.

Figure 18A:
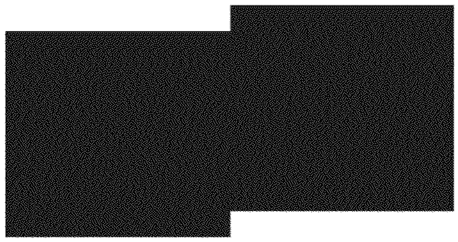
FIGS. 18A through 18C schematically illustrate shifting of pixels in a high resolution and downsampling results thereof according to the third exemplary embodiment.
Figure 18B:
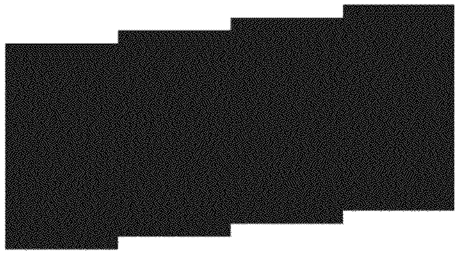
Figure 18C:
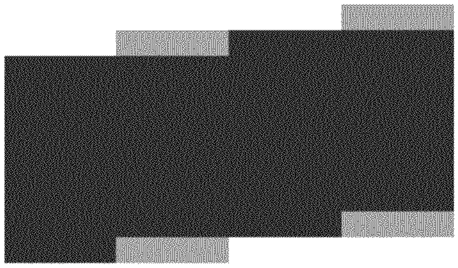

FIGS. 18A through 18C and FIGS. 19A through 19F illustrate detailed examples of input and output of the downsampling processing unit 1703. FIG. 18A schematically illustrates a step generated when there is no downsampling processing unit 1703. FIG. 18B illustrates a step generated when the changing is performed with a resolution of the twice, resulting in obtaining a step half sized from that of FIG. 18A. Subsequently, the downsampling processing is performed to finally obtain an output as illustrated in FIG. 18C. The step expressed with a high resolution results in a step less than one pixel.

Figure 19A:
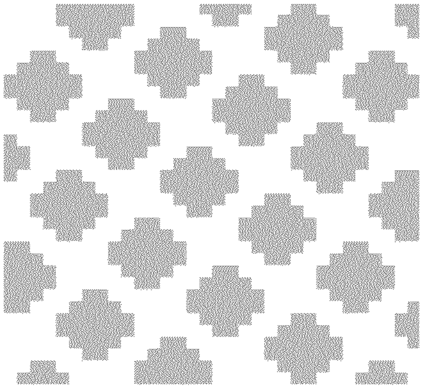
FIGS. 19A through 19F schematically illustrate screen patterns and downsampling results thereof according to the third exemplary embodiment.
Figure 19B:
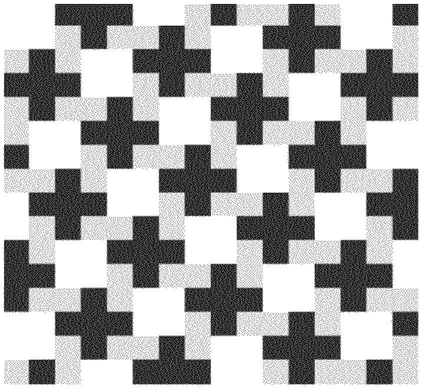
Figure 19C:
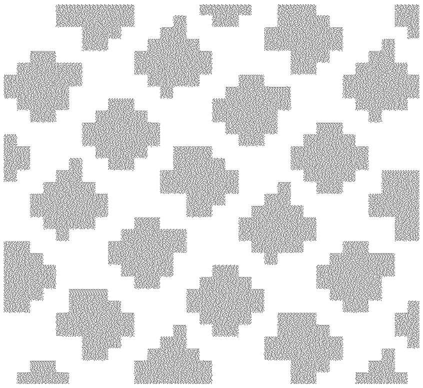
Figure 19D:
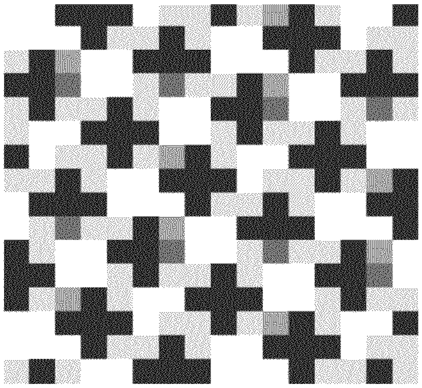
Figure 19E:
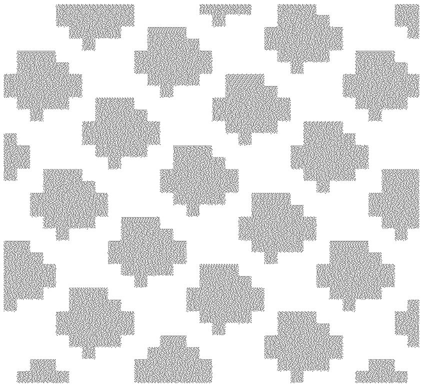
Figure 19F:
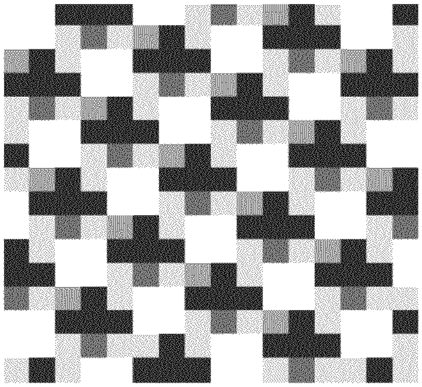

FIGS. 19A through 19F schematically illustrate how the screen patterns illustrated in FIGS. 10A through 10D change after the downsampling processing. FIG. 19A illustrates an input image that is processed with a resolution twice of the apparatus originally has. FIG. 19C illustrates an image subjected to the interpolation processing on the moving locus that ignores a screen pattern. FIG. 19E illustrates an image subjected to the interpolation processing on the moving locus before the downsampling processing as described in the first exemplary embodiment. FIGS. 19B, 19D, and 19F illustrate images of FIGS. 19A, 19C, and 19E after the downsampling processing, respectively.

In FIGS. 19C and 19D, the screen patterns come to have different dot shapes after the downsampling processing. In contrast, in FIG. 19F, the screen pattern which is obtained based on the input of the screen illustrated in FIG. 19E and subsequently subjected to the downsampling processing shows a uniform pattern without destruction of the screen pattern. As described above, in the apparatus that can express the gradation higher than one bit per one pixel by the PWM, the interpolation processing can be performed with the resolution higher than the apparatus originally has, so that a step can be interpolated so as to be smaller. Accordingly, even in a case where the image forming unit has a lower resolution, i.e., 600 dpi, the interpolation processing that can achieve a uniform screen pattern can be realized.

In the present exemplary embodiment, a description is made, exemplifying the resolution twice as the apparatus originally has, as to performing the downsampling using the adjacent total value. However, the processing can be performed by the resolution more than 4 times as the apparatus originally has. Also, the sampling can be made by performing convolution processing using, for example, a filter in which an individual weight is applied to the adjacent pixels, instead of the downsampling using the total value. Further, in the present exemplary embodiment, the description is made by exemplifying the image having the high resolution in both of the main scanning direction and the sub-scanning direction. However, the same effect can be produced by an image having the high resolution only in a direction in which the step is generated, i.e., the sub-scanning direction in this case.

The shifting of the pixel data of one pixel for cancelling the changing step in the sub-scanning direction is described above. However, the shifting can naturally be in the main scanning direction. With respect to shifting of image data which is generated by inserting or deleting one pixel for the sake of the geometric correction processing instead of the changing, shifting of pixel data can be realized without destroying a screen pattern by synchronizing a moving locus with a screen.

As described above, the present invention is directed to an image processing apparatus that includes an interpolation processing unit configured to perform pixel changing processing less than one pixel for a correction in less than one pixel on image data and a changing processing unit configured to perform pixel changing processing for a correction by one pixel on image data. The interpolation processing unit performs processing for shifting a pixel according to a moving locus synchronized with a cycle of the image data. Accordingly the image processing apparatus can realize a suitable image correction synchronized with the cycle of the image data while a step in the image is suppressed by the changing less than one pixel.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-271690 filed Dec. 6, 2010, which is hereby incorporated by reference herein in its entirety.

What is claimed is:

1. A printing apparatus, comprising:

a halftoning unit configured to halftone image data using a screen which has a cycle of patterns to obtain halftoned image data;

a determination unit configured to determine a moving locus which is synchronized with the cycle of patterns of the screen and connects the patterns of the screen with each other; and a correction unit configured to digitally correct, on a basis of a position deviation and the determined moving locus, the halftoned image data.

2. The printing apparatus according to claim 1, further comprising a downsampling unit configured to perform processing for lowering a resolution of corrected image data of which the pixels on the determined moving locus have been corrected.

3. A method for processing an image, the method comprising:

halftoning image data using a screen which has a cycle of patterns to obtain halftoned image data;

determining a moving locus which is synchronized with the cycle of patterns of the screen and connects the patterns of the screen with each other; and digitally correcting, on a basis of a position deviation and the determined moving locus, the halftoned image data.

4. A non-transitory storage medium in which codes for executing a method according to claim 3 are stored.

5. The printing apparatus according to claim 1, wherein the correction unit partially moves positions of the pixels on the determined moving locus.

6. The printing apparatus according to claim 1, wherein the correction unit is configured to move data of a pixel of the halftoned image data on a basis of the position deviation if the pixel is on the moving locus, and not to move data of a pixel of the halftoned image data on a basis of the position deviation if the pixel is not on the moving locus.

7. The method according to claim 3 wherein correcting comprises:

moving data of a pixel of the halftoned image data on a basis of the position deviation if the pixel is on the moving locus, and not moving data of a pixel of the halftoned image data on a basis of the position deviation if the pixel is not on the moving locus.

* * * * *